United States Patent
Suzuki et al.

(10) Patent No.: US 9,300,457 B2
(45) Date of Patent: Mar. 29, 2016

(54) TERMINAL APPARATUS, INTEGRATED CIRCUIT, WIRELESS COMMUNICATION METHOD, AND BASE STATION APPARATUS

(71) Applicant: Sharp Kabushiki Kaisha, Osaka-shi, Osaka (JP)

(72) Inventors: Shoichi Suzuki, Osaka (JP); Toshizo Nogami, Osaka (JP); Kazuyuki Shimezawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/761,968

(22) PCT Filed: Jan. 22, 2014

(86) PCT No.: PCT/JP2014/051299
§ 371 (c)(1),
(2) Date: Jul. 20, 2015

(87) PCT Pub. No.: WO2014/115781
PCT Pub. Date: Jul. 31, 2014

(65) Prior Publication Data
US 2015/0358124 A1    Dec. 10, 2015

(30) Foreign Application Priority Data
Jan. 22, 2013    (JP) .................................. 2013-009089

(51) Int. Cl.
*H04W 4/00* (2009.01)
*H04L 5/00* (2006.01)
*H04W 72/04* (2009.01)
*H04L 27/26* (2006.01)
*H04L 1/18* (2006.01)

(52) U.S. Cl.
CPC ............ *H04L 5/0055* (2013.01); *H04L 1/1861* (2013.01); *H04L 5/0053* (2013.01); *H04L 5/0057* (2013.01); *H04L 27/2601* (2013.01); *H04W 72/042* (2013.01)

(58) Field of Classification Search
None
See application file for complete search history.

(56) References Cited

U.S. PATENT DOCUMENTS

| 2013/0107809 | A1* | 5/2013 | Ko | H04L 5/0053 370/328 |
|---|---|---|---|---|
| 2014/0126499 | A1* | 5/2014 | Li | H04L 5/0094 370/329 |
| 2015/0244510 | A1* | 8/2015 | Chae | H04B 7/26 370/329 |

OTHER PUBLICATIONS

"Resource Efficient Implicit PUCCH Resource Allocation for ePDCCH," 3GPP TSG RAN WG1 Meeting #71, R1-125277, Nov. 12-16, 2012, pp. 1-7.

* cited by examiner

*Primary Examiner* — Edan Orgad
*Assistant Examiner* — Rebecca Song
(74) *Attorney, Agent, or Firm* — Keating & Bennett, LLP

(57) ABSTRACT

A mobile station apparatus and a base station apparatus each efficiently transmit and/or receive, using a PUCCH, a HARQ-ACK for a transport block transmitted on a PDSCH. In a case where an EPDCCH candidate corresponding to a first EPDCCH-PRB-set and an EPDCCH candidate corresponding to a second EPDCCH-PRB-set correspond to the same resource elements and furthermore a same value of a DMRS scrambling sequence initialization parameter is configured for the two EPDCCH-PRB-sets and DCI formats with the same payload size are monitored for the two EPDCCH candidates, then a terminal apparatus determines a first ECCE number based on the first EPDCCH-PRB-set to determine a PUCCH resource for transmission of HARQ-ACK.

12 Claims, 17 Drawing Sheets

FIG. 9

| the number of EPDCCH-PRB-set | the number of ECCE | the number of PRB pair | the number of EREG | | | |
|---|---|---|---|---|---|---|
| 1 | 0 | 0 | < 0 | 4 | 8 | 12 > |
| | 1 | 0 | < 1 | 5 | 9 | 13 > |
| | 2 | 0 | < 2 | 6 | 10 | 14 > |
| | 3 | 0 | < 3 | 7 | 11 | 15 > |
| | 4 | 1 | < 0 | 4 | 8 | 12 > |
| | 5 | 1 | < 1 | 5 | 9 | 13 > |
| | 6 | 1 | < 2 | 6 | 10 | 14 > |
| | 7 | 1 | < 3 | 7 | 11 | 15 > |
| | 8 | 2 | < 0 | 4 | 8 | 12 > |
| | 9 | 2 | < 1 | 5 | 9 | 13 > |
| | 10 | 2 | < 2 | 6 | 10 | 14 > |
| | 11 | 2 | < 3 | 7 | 11 | 15 > |
| | 12 | 3 | < 0 | 4 | 8 | 12 > |
| | 13 | 3 | < 1 | 5 | 9 | 13 > |
| | 14 | 3 | < 2 | 6 | 10 | 14 > |
| | 15 | 3 | < 3 | 7 | 11 | 15 > |
| 2 | 0 | 2 | < 0 | 4 | 8 | 12 > |
| | 1 | 2 | < 1 | 5 | 9 | 13 > |
| | 2 | 2 | < 2 | 6 | 10 | 14 > |
| | 3 | 2 | < 3 | 7 | 11 | 15 > |
| | 4 | 3 | < 0 | 4 | 8 | 12 > |
| | 5 | 3 | < 1 | 5 | 9 | 13 > |
| | 6 | 3 | < 2 | 6 | 10 | 14 > |
| | 7 | 3 | < 3 | 7 | 11 | 15 > |

FIG. 10

| cell to which EPDCCH corresponds | the number of EPDCCH-PRB-set | Aggregation level | the number of EPDCCH candidates | the number of ECCEs which constitute set of EPDCCH candidates |
|---|---|---|---|---|
| primary cell | 1 | 1 | 4 | <0>, <1>, <2>, <3> |
| | | 2 | 4 | <6 7>, <8 9>, <10 11>, <12 13> |
| | | 4 | 1 | <8 9 10 11> |
| | | 8 | 1 | <8 9 10 11 12 13 14 15> |
| | 2 | 1 | 3 | <3>, <4>, <5>, <6> |
| | | 2 | 2 | <4 5>, <6 7> |
| | | 4 | 1 | <4 5 6 7> |
| | | 8 | 0 | — |
| secondary cell | 1 | 1 | 4 | <4>, <5>, <6>, <7> |
| | | 2 | 4 | <0 1>, <2 3>, <4 5>, <14 15> |
| | | 4 | 1 | <12 13 14 15> |
| | | 8 | 1 | <0 1 2 3 4 5 6 7> |
| | 2 | 1 | 3 | <0>, <1>, <2>, <7> |
| | | 2 | 2 | <0 1>, <2 3> |
| | | 4 | 1 | <0 1 2 3> |
| | | 8 | 0 | — |

FIG. 13

| $n_{PUCCH}^{(1,p)}$ | m | ORTHOGONAL SEQUENCE INDEX $n_{OC}^{(p)}$ | CYCLIC SHIFT INDEX $n_{CS}^{(p)}$ |
|---|---|---|---|
| 0+36×k | k | 0 | 0 |
| 1+36×k | k | 0 | 1 |
| 2+36×k | k | 0 | 2 |
| 3+36×k | k | 0 | 3 |
| 4+36×k | k | 0 | 4 |
| 5+36×k | k | 0 | 5 |
| 6+36×k | k | 0 | 6 |
| 7+36×k | k | 0 | 7 |
| 8+36×k | k | 0 | 8 |
| 9+36×k | k | 0 | 9 |
| 10+36×k | k | 0 | 10 |
| 11+36×k | k | 0 | 11 |
| 12+36×k | k | 1 | 0 |
| 13+36×k | k | 1 | 1 |
| 14+36×k | k | 1 | 2 |
| 15+36×k | k | 1 | 3 |
| 16+36×k | k | 1 | 4 |
| 17+36×k | k | 1 | 5 |
| 18+36×k | k | 1 | 6 |
| 19+36×k | k | 1 | 7 |
| 20+36×k | k | 1 | 8 |
| 21+36×k | k | 1 | 9 |
| 22+36×k | k | 1 | 10 |
| 23+36×k | k | 1 | 11 |
| 24+36×k | k | 2 | 0 |
| 25+36×k | k | 2 | 1 |
| 26+36×k | k | 2 | 2 |
| 27+36×k | k | 2 | 3 |
| 28+36×k | k | 2 | 4 |
| 29+36×k | k | 2 | 5 |
| 30+36×k | k | 2 | 6 |
| 31+36×k | k | 2 | 7 |
| 32+36×k | k | 2 | 8 |
| 33+36×k | k | 2 | 9 |
| 34+36×k | k | 2 | 10 |
| 35+36×k | k | 2 | 11 |

TERMINAL APPARATUS, INTEGRATED CIRCUIT, WIRELESS COMMUNICATION METHOD, AND BASE STATION APPARATUS

TECHNICAL FIELD

The present invention relates to a terminal apparatus, an integrated circuit, a wireless communication method and a base station apparatus.

BACKGROUND ART

A wireless access method and a wireless network in cellular mobile communication (hereinafter referred to as "Long Term Evolution (LTE)" or "Evolved Universal Terrestrial Radio Access (EUTRA)") have been under consideration by 3rd Generation Partnership Project (3GPP). In LTE, orthogonal frequency division multiplexing (OFDM) is used as a downlink communication method. Furthermore, in LTE, SC-FDMA (Single-Carrier Frequency Division Multiple Access) is used as an uplink communication method. In LTE, a base station apparatus is called eNodeB (evolved NodeB), and a mobile station apparatus (a terminal apparatus) is called UE (User Equipment). The LTE is a cellular communication system in which a plurality of areas covered by respective base station apparatuses are disposed in the form of cells. One base station apparatus may manage a plurality of cells. One mobile station apparatus is allowed to make communication in one or a plurality of cells. The cell is also called a serving cell.

LTE supports HARQ (Hybrid Automatic Repeat reQuest) for uplink data. In LTE, when a mobile station apparatus successfully decodes a transport block received via a PDSCH (Physical Downlink Shared Channel), the mobile station apparatus transmits ACK (positive acknowledgement, acknowledgement) in terms of this transport block via PUCCH (Physical Uplink Control Channel). On the other hand, in LTE, when a mobile station apparatus fails to decode a transport block received via the PDSCH, the mobile station apparatus transmits NACK (negative acknowledgement) in terms of this transport block via a PUCCH (Physical Uplink Control Channel).

In LTE, a base station apparatus performs scheduling on a transport block based on ACK or NACK received via a PUCCH. For example, when the base station apparatus in LTE receives NACK, the base station apparatus retransmits the transport block. ACK and NACK are collectively referred to as HARQ-ACK or HARQ feedback.

The LTE base station apparatus transmits downlink control information used in the scheduling on PDSCH via PDCCH (Physical Downlink Control Channel) or EPDCCH (Enhanced Physical Downlink Control Channel).

The LTE base station apparatus sets one or two EPDCCH-PRB-sets to the terminal apparatus. The EPDCCH-PRB-set is a set of physical resource blocks including physical resource blocks (PRBs) used by the terminal apparatus to monitor EPDCCH. Monitoring implies attempting to decode EPDCCH.

The LTE base station apparatus is capable of setting a first parameter corresponding to a first EPDCCH-PRB-set and a second parameter corresponding to a second EPDCCH-PRB-set to the mobile station apparatus. Using a parameter corresponding to an EPDCCH-PRB-set via which EPDCCH is detected, the LTE mobile station apparatus determines a PUCCH resource to be used in transmitting HARQ-ACK. This makes it possible for the LTE base station apparatus to flexibly control the allocation of PUCCH resources (NPL 1).

In 3GPP, to allow a mobile station apparatus to communicate with a plurality of transmission/reception points in an efficient manner, support for CoMP (Coordinated Multi-Point transmission and reception) is under consideration. For example, a mobile station apparatus may receive PDSCH transmitted from a plurality of transmission points. The plurality of transmission/reception points may be controlled by a single base station apparatus or different two or more base station apparatuses.

CITATION LIST

Non Patent Literature

NPL 1: Resource Efficient Implicit PUCCH Resource Allocation f or ePDCCHs", R1-125227, 3GPP TSG-RAN WG1 Meeting #71, New Orleans, USA, 12-16 Nov. 2012.

SUMMARY OF INVENTION

Technical Problem

However, in a case where a resource used by a mobile station apparatus to monitor EPDCCH in the first EPDCCH-PRB-set is the same as a resource used by the mobile station apparatus to monitor EPDCCH in the second EPDCCH-PRB-set, there is a possibility that the mobile station apparatus cannot determine whether the EPDCCH is detected in the first EPDCCH-PRB-set or the second EPDCCH-PRB-set. Thus, there is a problem that it is not clear, for the mobile station apparatus, which one of the first and second parameters is to be used in determining the PUCCH resource.

In view of the above, it is an object of the present invention to provide a mobile station apparatus (a terminal apparatus), a base station apparatus, a wireless communication method, and an integrated circuit, capable of efficiently transmitting or receiving, using a PUCCH, HARQ-ACK to a transport block transmitted on PDSCH.

Solution to Problem (1) To achieve the above object, the present invention provides means described below. That is, the invention provides a terminal apparatus including a transmission unit configured to, in a case where downlink control information indicating a transmission of PDSCH is detected using EPDCCH, transmit HARQ-ACK using a PUCCH resource, wherein in a case where two EPDCCH-PRB-sets including a first EPDCCH-PRB-set and a second EPDCCH-PRB-set are set, wherein in a case where a same value of a DMRS scrambling sequence initialization parameter is configured for the two EPDCCH-PRB-sets, wherein in a case where downlink control information with a certain payload size and mapped to a certain set of resource elements is received using an EPDCCH candidate corresponding to one of the two EPDCCH-PRB-sets, wherein in a case where it is configured to monitor downlink control information with a same payload size as the payload size and mapped to a same set as the set of resource elements using an EPDCCH candidate corresponding to the other one of the two EPDCCH-PRB-sets, wherein in a case where a first ECCE number of the detected EPDCCH candidate is used for determining the PUCCH resource used by the transmission unit for transmitting HARQ-ACK, the first ECCE number is determined based on the first EPDCCH-PRB-set, while in a case where the two EPDCCH candidates corresponding to the respective two EPDCCH-PRB-sets are mapped to the same set of resource elements, at least the two EPDCCH candidates corresponding to the respective two EPDCCH-PRB-sets are mapped starting with a resource element in a same OFDM symbol.

(2) In the terminal apparatus according to the present invention, the OFDM symbol with which the mapping of each EPDCCH candidate to the resource element is started is allowed to be set individually for each of the two EPDCCH-PRB-sets.

(3) In the terminal apparatus according to the present invention, in the case where the two EPDCCH candidates corresponding to the respective two EPDCCH-PRB-sets are mapped to the same set of resource elements, furthermore at least positions of CRSs and positions of CSI-RSs for use in the mapping of the two EPDCCH candidates corresponding to the respective two EPDCCH-PRB-sets to resource elements are the same.

(4) In the terminal apparatus according to the present invention, a location of the CRS and a location of the CSI-RS for use in the mapping of the EPDCCH candidate to a resource element are allowed to be set individually for each of the two EPDCCH-PRB-sets.

(5) In the terminal apparatus according to the present invention, in the case where the two EPDCCH candidates corresponding to the respective two EPDCCH-PRB-sets are mapped to the same set of resource elements, furthermore the two EPDCCH candidates corresponding to the respective two EPDCCH-PRB-sets correspond to a same set of EREGs.

(6) The present invention also provides a terminal apparatus including a transmission unit configured to, in a case where downlink control information indicating a transmission of PDSCH is detected using EPDCCH, transmit HARQ-ACK using a PUCCH resource, wherein in a case where two EPDCCH-PRB-sets including a first EPDCCH-PRB-set and a second EPDCCH-PRB-set are set, wherein in a case where a same value of a DMRS scrambling sequence initialization parameter is configured for the two EPDCCH-PRB-sets, wherein in a case where downlink control information with a certain payload size and mapped to a certain set of resource elements is received using an EPDCCH candidate corresponding to one of the two EPDCCH-PRB-sets, wherein in a case where it is configured to monitor downlink control information with a same payload size as the payload size and mapped to a same set as the set of resource elements using an EPDCCH candidate corresponding to the other one of the two EPDCCH-PRB-sets, wherein in a case where a first ECCE number of the detected EPDCCH candidate is used for determining the PUCCH resource used by the transmission unit for transmitting HARQ-ACK, the first ECCE number is determined based on the first EPDCCH-PRB-set, while in a case where the two EPDCCH candidates corresponding to the respective two EPDCCH-PRB-sets are mapped to the same set of resource elements, then at least positions of CRSs and positions of CSI-RSs for use in the mapping of the two EPDCCH candidates corresponding to the respective two EPDCCH-PRB-sets to resource elements are the same.

(7) The present invention also provides an integrated circuit mounted in a terminal apparatus, the integrated circuit configured to cause the terminal apparatus to have a set of functions including a function of transmitting HARQ-ACK using a PUCCH resource in a case where downlink control information indicating a transmission of PDSCH is detected using EPDCCH, wherein in a case where two EPDCCH-PRB-sets including a first EPDCCH-PRB-set and a second EPDCCH-PRB-set are set, wherein in a case where a same value of a DMRS scrambling sequence initialization parameter is configured for the two EPDCCH-PRB-sets, wherein in a case where downlink control information with a certain payload size and mapped to a certain set of resource elements is received using an EPDCCH candidate corresponding to one of the two EPDCCH-PRB-sets, wherein in a case where it is configured to monitor downlink control information with a same payload size as the payload size and mapped to a same set as the set of resource elements using an EPDCCH candidate corresponding to the other one of the two EPDCCH-PRB-sets, wherein in a case where a first ECCE number of the detected EPDCCH candidate is used for determining the PUCCH resource used by the transmission unit for transmitting HARQ-ACK, the first ECCE number is determined based on the first EPDCCH-PRB-set, while in a case where the two EPDCCH candidates corresponding to the respective two EPDCCH-PRB-sets are mapped to the same set of resource elements, at least the two EPDCCH candidates corresponding to the respective two EPDCCH-PRB-sets are mapped starting with a resource element in a same OFDM symbol.

(8) In the integrated circuit disposed in the terminal apparatus according to the present invention, the OFDM symbol with which the mapping of each EPDCCH candidate to the resource element is started is allowed to be set individually for each of the two EPDCCH-PRB-sets.

(9) In the integrated circuit disposed in the terminal apparatus according to the present invention, in the case where the two EPDCCH candidates corresponding to the respective two EPDCCH-PRB-sets are mapped to the same set of resource elements, furthermore at least positions of CRSs and positions of CSI-RSs for use in the mapping of the two EPDCCH candidates corresponding to the respective two EPDCCH-PRB-sets to resource elements are the same.

(10) In the integrated circuit disposed in the terminal apparatus according to the present invention, positions of the CRSs and positions of the CSI-RSs for use in the mapping of the EPDCCH candidate to a resource element are allowed to be set individually for each of the two EPDCCH-PRB-sets.

(11) In the integrated circuit disposed in the terminal apparatus according to the present invention, in the case where the two EPDCCH candidates corresponding to the respective two EPDCCH-PRB-sets are mapped to the same set of resource elements, furthermore the two EPDCCH candidates corresponding to the respective two EPDCCH-PRB-sets correspond to a same set of EREGs.

(12) The present invention also provides a wireless communication method used by a terminal apparatus, the method including transmitting HARQ-ACK using a PUCCH resource in a case where downlink control information indicating a transmission of PDSCH is detected using EPDCCH, wherein in a case where two EPDCCH-PRB-sets including a first EPDCCH-PRB-set and a second EPDCCH-PRB-set are set, wherein in a case where a same value of a DMRS scrambling sequence initialization parameter is configured for the two EPDCCH-PRB-sets, wherein in a case where downlink control information with a certain payload size and mapped to a certain set of resource elements is received using an EPDCCH candidate corresponding to one of the two EPDCCH-PRB-sets, wherein in a case where it is configured to monitor downlink control information with a same payload size as the payload size and mapped to a same set as the set of resource elements using an EPDCCH candidate corresponding to the other one of the two EPDCCH-PRB-sets, wherein in a case where a first ECCE number of the detected EPDCCH candidate is used for determining the PUCCH resource used by the transmission unit for transmitting HARQ-ACK, the first ECCE number is determined based on the first EPDCCH-PRB-set, while in a case where the two EPDCCH candidates corresponding to the respective two EPDCCH-PRB-sets are mapped to the same set of resource elements, at least the two EPDCCH candidates corresponding to the respective two EPDCCH-PRB-sets are mapped starting with a resource element in a same OFDM symbol.

(13) The present invention also provides a base station apparatus including a reception unit configured to, in a case where downlink control information indicating a transmission of PDSCH is detected using EPDCCH is transmitted to a terminal apparatus, receive HARQ-ACK using a PUCCH resource, wherein in a case where two EPDCCH-PRB-sets including a first EPDCCH-PRB-set and a second EPDCCH-PRB-set are set in the terminal apparatus, wherein in a case where for each of the two EPDCCH-PRB-sets, a same value of a DMRS scrambling sequence initialization parameter is configured in the terminal apparatus, wherein in a case where downlink control information with a certain payload size and mapped to a certain set of resource elements is transmitted using an EPDCCH candidate corresponding to one the two EPDCCH-PRB-sets, wherein in a case where the terminal apparatus is configured so as to monitor downlink control information with a same payload size as the payload size and mapped to a same set as the set of resource elements by using an EPDCCH candidate corresponding to the other one of the two EPDCCH-PRB-sets, wherein in a case where a first ECCE number of the transmitted EPDCCH candidate is used for determining the PUCCH resource for reception of HARQ-ACK in the reception unit, the first ECCE number is determined based on the first EPDCCH-PRB-set, while in a case where the two EPDCCH candidates corresponding to the respective two EPDCCH-PRB-sets are mapped to the same set of resource elements, at least the two EPDCCH candidates corresponding to the respective two EPDCCH-PRB-sets are mapped starting with a resource element in a same OFDM symbol.

(14) In the base station apparatus according to the present invention, the OFDM symbol with which the mapping of each EPDCCH candidate to the resource element is started is allowed to be set individually for each of the two EPDCCH-PRB-sets.

(15) In the base station apparatus according to the present invention, in the case where the two EPDCCH candidates corresponding to the respective two EPDCCH-PRB-sets are mapped to the same set of resource elements, furthermore at least positions of CRSs and positions of CSI-RSs for use in the mapping of the two EPDCCH candidates corresponding to the respective two EPDCCH-PRB-sets to resource elements are the same.

(16) In the base station apparatus according to the present invention, positions of the CRSs and positions of the CSI-RSs for use in the mapping of the EPDCCH candidate to a resource element are allowed to be set individually for each of the two EPDCCH-PRB-sets.

(17) In the base station apparatus according to the present invention, in the case where the two EPDCCH candidates corresponding to the respective two EPDCCH-PRB-sets are mapped to the same set of resource elements, furthermore the two EPDCCH candidates corresponding to the respective two EPDCCH-PRB-sets correspond to the same set of EREGs.

(18) The present invention also provides a base station apparatus including a reception unit, configured to, in a case where downlink control information indicating a transmission of a PDSCH is transmitted using EPDCCH, receive HARQ-ACK using a PUCCH resource, wherein in a case where two EPDCCH-PRB-sets including a first EPDCCH-PRB-set and a second EPDCCH-PRB-set are set in the terminal apparatus, wherein in a case where for each of the two EPDCCH-PRB-sets, a same value of a DMRS scrambling sequence initialization parameter is configured in the terminal apparatus, wherein in a case where downlink control information with a certain payload size and mapped to a certain set of resource elements is transmitted using an EPDCCH candidate corresponding to one the two EPDCCH-PRB-sets, wherein in a case where the terminal apparatus is configured so as to monitor downlink control information with a same payload size as the payload size and mapped to the same set as the set of resource elements using an EPDCCH candidate corresponding to the other one of the two EPDCCH-PRB-sets, wherein in a case where a first ECCE number of the transmitted EPDCCH candidate is used for determining the PUCCH resource for reception of HARQ-ACK in the reception unit, the first ECCE number is determined based on the first EPDCCH-PRB-set, while in a case where the two EPDCCH candidates corresponding to the respective two EPDCCH-PRB-sets are mapped to the same set of resource elements, at least positions of CRSs and positions of CSI-RSs for use in the mapping of the two EPDCCH candidates corresponding to the respective two EPDCCH-PRB-sets to resource elements are the same.

Advantageous Effects of Invention

The present invention allows a mobile station apparatus and a base station apparatus to transmit and/or receive, efficiently using a PUCCH, HARQ-ACK to a transport block transmitted on a PDSCH.

BRIEF DESCRIPTION OF DRAWINGS

FIG. 9 is a table representing an EREG corresponding to an ECCE in an EPDCCH-PRB-set.

FIG. 10 is a table illustrating an example of EPDCCH USS according to the present embodiment.

FIG. 13 is a diagram illustrating a correspondence between an index of a PUCCH resource and a PUCCH resource according to the present embodiment.

DESCRIPTION OF EMBODIMENTS

An embodiment according to the present invention is described below.

In the embodiment, a mobile station apparatus performs transmission or reception in a plurality of cells simultaneously. However, the present invention may also be applied to a case where a mobile station apparatus performs transmission or reception in a single cell. The technique for a mobile station apparatus to communicate with a plurality of cells is called cell aggregation or carrier aggregation. The present invention may be applied to each cell in the plurality of cells aggregated or may be applied to part of the plurality of cells aggregated.

Note that the cell may also be referred to as a serving cell. The plurality of serving cells include one primary cell and one or more secondary cells. A primary cell is a serving cell that performs an initial access, a serving cell that performs connection reestablishment, or a serving cell specified by a handover command.

The present embodiment is described further with reference to a wireless communication system of a FDD (Frequency Division Duplex) scheme. However, the present invention may also be applied to a wireless communication system of a TDD (Time Division Duplex) scheme. The present invention may also be applied to a wireless communication system in which a cell using the TDD scheme and a cell using the FDD scheme are aggregated.

Figure 1:
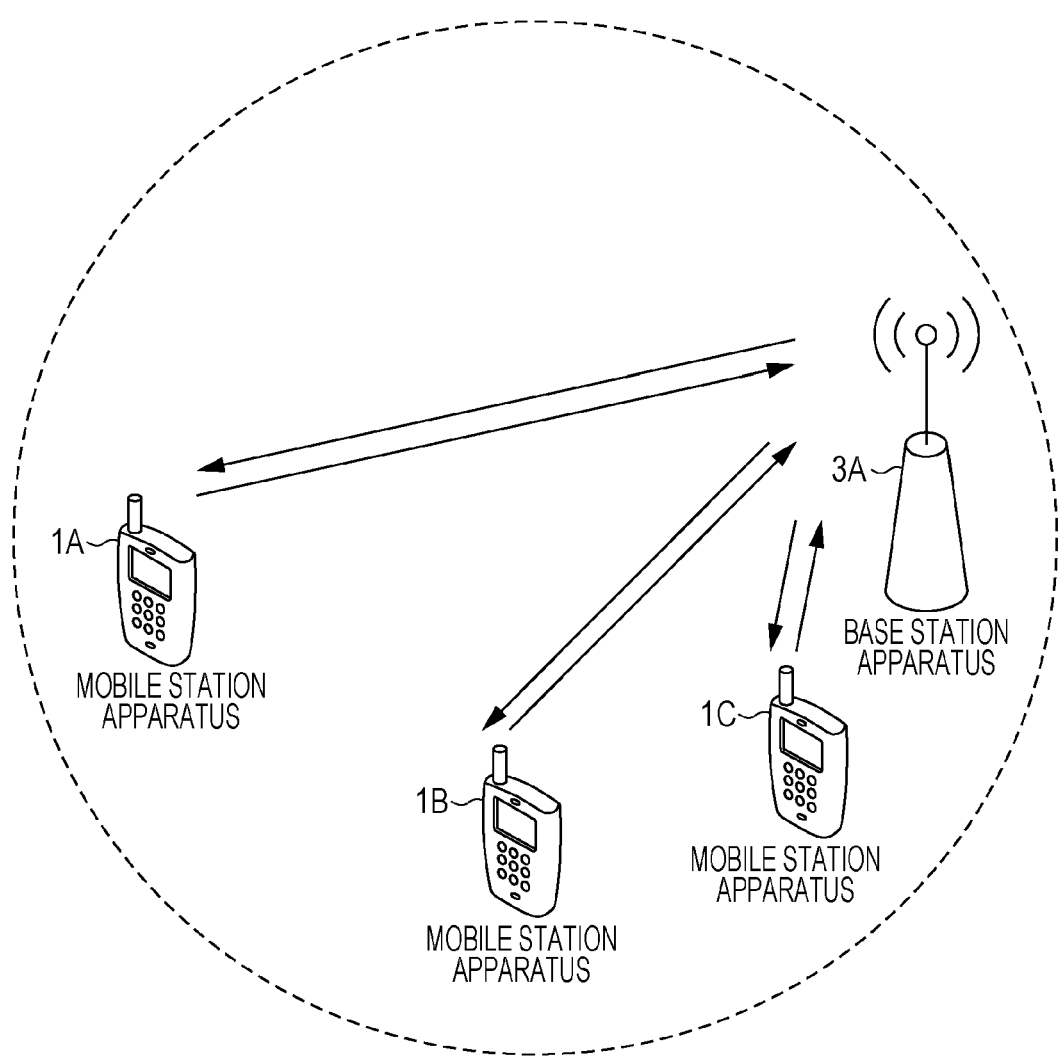
FIG. 1 is a conceptual diagram illustrating a wireless communication system according to the present embodiment.

FIG. 1 is a conceptual diagram illustrating a wireless communication system according to the present embodiment. In FIG. 1, the wireless communication system includes mobile station apparatuses 1A to 1C and a base station apparatus 3. Hereinafter, the mobile station apparatuses 1A to 1C are referred to as mobile station apparatuses 1.

Physical channels and physical signals according to the present embodiment are described below.

In FIG. 1, in uplink wireless communication from a mobile station apparatus 1 to the base station apparatus 3, uplink physical channels described below are used to transmit information output from a higher layer.

PUCCH (Physical Uplink Control Channel)
PUSCH (Physical Uplink Shared Channel)
PRACH (Physical Random Access Channel)

PUCCH is used to transmit uplink control information (UCI). The uplink control information includes HARQ-ACK (HARQ feedback, response information) in response to downlink data (Downlink-Shared Channel (DL-SCH)).

PUSCH is used to transmit uplink data (Uplink-Shared Channel (UL-SCH)). PUSCH may be used to transmit uplink control information together with uplink data. PUSCH may be used to transmit only uplink control information.

The mobile station apparatus 1 makes setting, based on information (signaling) received from the base station apparatus 3, as to whether or not to transmit PUSCH and PUCCH at the same time. In a case where the mobile station apparatus 1 makes setting such that PUSCH and PUCCH are not to be transmitted at the same time, and, in this situation, in a case where PUSCH is transmitted in a sub-frame n, the mobile station apparatus 1 transmits HARQ-ACK using PUSCH except for a case where PUSCH is transmitted in the middle of a contention based random access procedure. In the case where the mobile station apparatus 1 makes setting such that PUSCH and PUCCH are not to be transmitted at the same time, and, in this situation, in a case where PUSCH is not transmitted in the sub-frame n, the mobile station apparatus 1 transmits HARQ-ACK using PUCCH in the sub-frame n.

In a case where the mobile station apparatus 1 makes setting such that PUSCH and PUCCH are to be transmitted at the same time, the mobile station apparatus 1 transmits HARQ-ACK using PUCCH regardless of whether or not PUSCH is transmitted in the sub-frame n.

PRACH is used to transmit a random access preamble. A primary purpose of PRACH is to achieve synchronization in time domain between the mobile station apparatus 1 and the base station apparatus 3.

In FIG. 1, in uplink wireless communication, uplink physical signals described below are used. The uplink physical signals are not used to transmit information output from a higher layer, but they are used by a physical layer.

Uplink reference signal (UL RS)

In the present embodiment, two types of uplink reference signals described below are used.

DMRS (Demodulation Reference Signal) for PUCCH/PUSCH
SRS (Sounding Reference Signal)

DMRS is involved in transmission of PUSCH or PUCCH. DMRS is time-multiplexed with PUSCH or PUCCH. The base station apparatus 3 performs a demodulation process on PUSCH or PUCCH by using DMRS. Hereinafter, transmitting PUSCH and DMRS together will also be referred to simply as transmitting PUSCH. Hereinafter, transmitting PUCCH and DMRS together will also be referred to simply as transmitting PUCCH.

SRS is not involved in transmission of PUSCH or PUCCH. The base station apparatus 3 uses SRS to measure an uplink channel state. A symbol on which SRS is transmitted is also referred to as a sounding reference symbol. Details of SRS will be described later.

In FIG. 1, in downlink wireless communication from the base station apparatus 3 to the mobile station apparatus 1, downlink physical channels described below are used. The downlink physical channels are used to transmit information output from a higher layer.

PBCH (Physical Broadcast Channel)
PCFICH (Physical Control Format Indicator Channel)
PHICH (Physical Hybrid automatic repeat request Indicator Channel)
PDCCH (Physical Downlink Control Channel)
EPDCCH (Enhanced Physical Downlink Control Channel)
PDSCH (Physical Downlink Shared Channel)

PBCH is used to broadcast system information (master information block, Broadcast Channel (BCH)) used in common by the mobile station apparatuses 1.

PCFICH is used to transmit information indicating a region (OFDM symbol) used to transmit PDCCH.

PHICH is used to transmit a HARQ indicator indicating HARQ-ACK in response to uplink data (Uplink Shared Channel (UL-SCH)) received by the base station apparatus 3. For example, in a case where the mobile station apparatus 1 receives a HARQ indicator indicating ACK, retransmission of corresponding uplink data is not performed. For example, in a case where the mobile station apparatus 1 receives a HARQ indicator indicating NAK, corresponding uplink data is re-transmitted.

PDCCH and EPDCCH are used to transmit downlink control information (DCI). The downlink control information is also referred to as a DCI format. The downlink control information includes a downlink grant (also referred to as a downlink assignment) and an uplink grant. The downlink grant is downlink control information used in scheduling of a single PDSCH within a single cell. The downlink grant is used for the scheduling of PDSCH in the same sub-frame as the sub-frame in which the downlink grant is transmitted. The uplink grant is downlink control information used in scheduling of a single PUSCH within a single cell. The uplink grant is used for the scheduling of a single PUSCH in a sub-frame which is behind by four more sub-frames from a sub-frame in which the uplink grant is transmitted.

The DCI format is added with CRC (Cyclic Redundancy Check) parity bits. The CRC parity bits are scrambled with C-RNTI (Cell-Radio Network Temporary Identifier) or SPS C-RNTI (Semi Persistent Scheduling Cell-Radio Network Temporary Identifier). C-RNTI and SPS C-RNTI are identifiers for identifying a mobile station apparatus in a cell.

C-RNTI is used to control PDSCH or PUSCH in a single sub-frame. SPS C-RNTI is used to periodically allocate PDSCH or PUSCH resources.

PDSCH is used to transmit downlink data (Downlink Shared Channel (DL-SCH)).

In FIG. 1, in downlink wireless communication, downlink physical signals described below are used. The downlink physical signals are not used to transmit information output from a higher layer but used by a physical layer.

Synchronization signal (SS)

Downlink reference signal (DLRS)

The synchronization signal is used by the mobile station apparatus 1 to achieve synchronization in downlink in the frequency domain and the time domain.

In the present embodiment, five types of uplink reference signals described below are used.

CRS (Cell-specific Reference Signal)

URS associated PDSCH (UE-specific Reference Signal)

DMRS associated with EPDCCH (Demodulation Reference Signal)

NZP CSI-RS (Non-Zero Power Chanel State Information Reference Signal)

ZP CSI-RS (Zero Power Chanel State Information Reference Signal)

CRS is transmitted in all sub-frames. CRS is used to demodulate PBCH/PDCCH/PHICH/PCFICH/PDSCH. CRS may be used by the mobile station apparatus 1 to calculate downlink channel state information. PBCH/PDCCH/PHICH/PCFICH is transmitted via an antenna port used in transmission of CRS.

URS associated with PDSCH is transmitted in a sub-frame and in a band used in transmitting PDSCH associated with URS. URS is used to demodulate PDSCH associated with URS. PDSCH is transmitted via an antenna port used in transmitting CRS or URS.

A DCI format 1A is used in scheduling of PDSCH transmitted via an antenna port used in transmission of CRS. A DCI format 2D is used in scheduling of PDSCH transmitted via an antenna port used in transmission of URS. The payload size (the number of bits) of the DCI format is defined for each DCI format. Note that a set of information included in the DCI format 1A is different from a set of information included in the DCI format 2D.

DMRS associated with EPDCCH is transmitted in a sub-frame and in a band used in transmitting EPDCCH associated with DMRS. DMRS is used to demodulate EPDCCH associated with DMRS. EPDCCH is transmitted via an antenna port used in transmission of DMRS.

NZP CSI-RS is transmitted in a specified sub-frame. A resource used in transmitting NZP CSI-RS is set by the base station apparatus. NZP CSI-RS is used by the mobile station apparatus 1 to calculate downlink channel state information.

A resource for ZP CSI-RS is set by the base station apparatus. The base station apparatus does not transmit ZP CSI-RS. The base station apparatus does not transmit PDSCH and EPDCCH in the resource set for ZP CSI-RS. For example, if a resource with which NZP CSI-RS is transmitted in a certain cell is set as a resource for ZP CSI-RS in an adjacent cell, then it is possible for the mobile station apparatus to measure channel state information using CSI-RS in the certain cell having no interference from the adjacent cell.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

BCH, UL-SCH, and DL-SCH are transport channels. A channel used in a Medium Access Control (MAC) layer is referred to as a transport channel. The transport channel is also referred to as a transport block.

A structure of a radio frame according to the present embodiment is described below.

Figure 2:
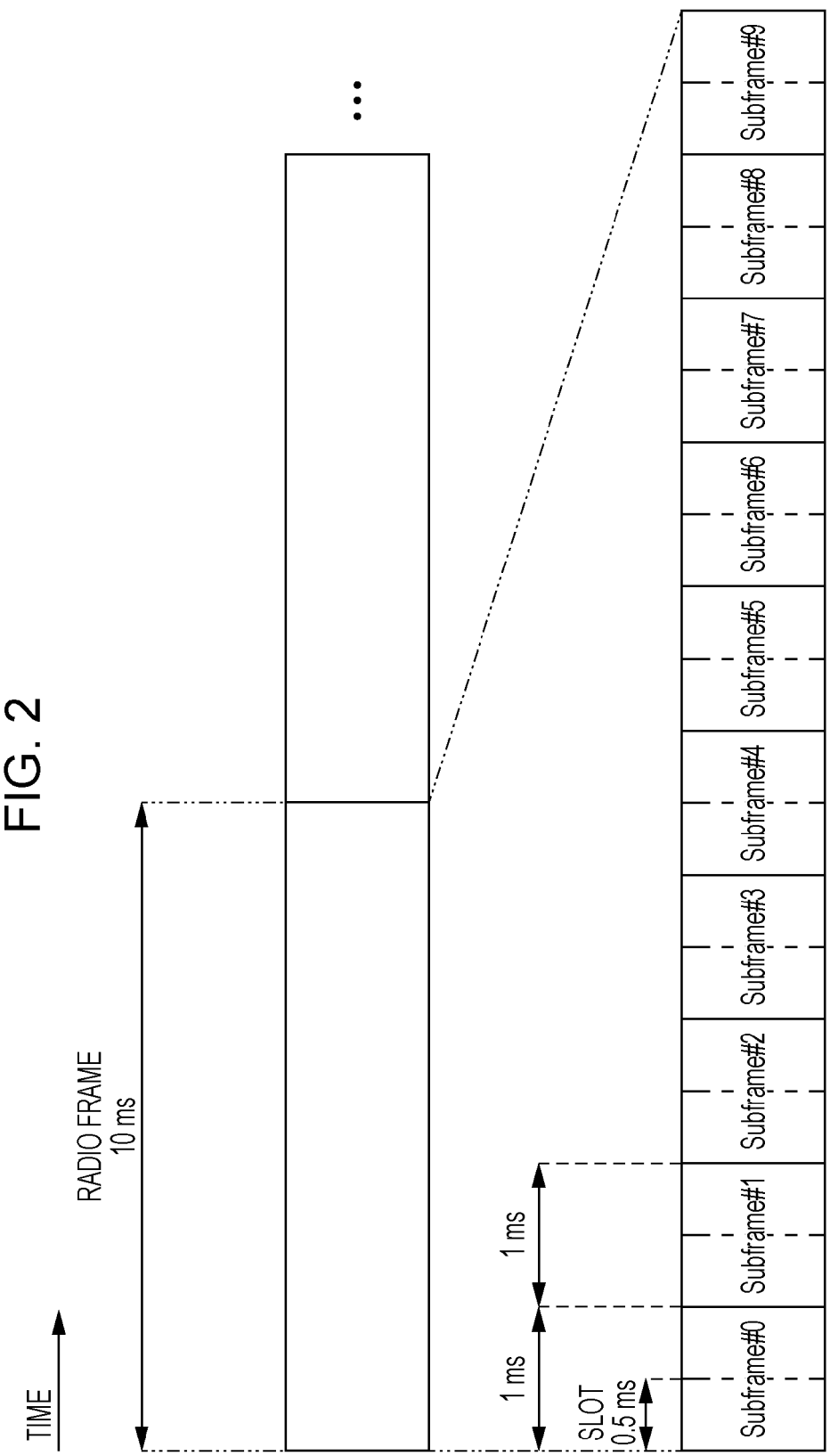
FIG. 2 is a diagram illustrating in a brief manner a structure of a radio frame according to the present embodiment.

FIG. 2 is a diagram illustrating in a brief manner the structure of a radio frame according to the present embodiment. In FIG. 2, a horizontal axis is a time axis. Each radio frame has a length of 10 ms. Each radio frame includes 10 sub-frames. Each sub-frame has a length of 1 ms and is defined by two continuous slots. An i-th sub-frame in a radio frame includes a (2×i)th slot and a (2×i+1)th slot. Each slot has a length of 0.5 ms.

A slot structure according to the present embodiment is described below.

Figure 3:
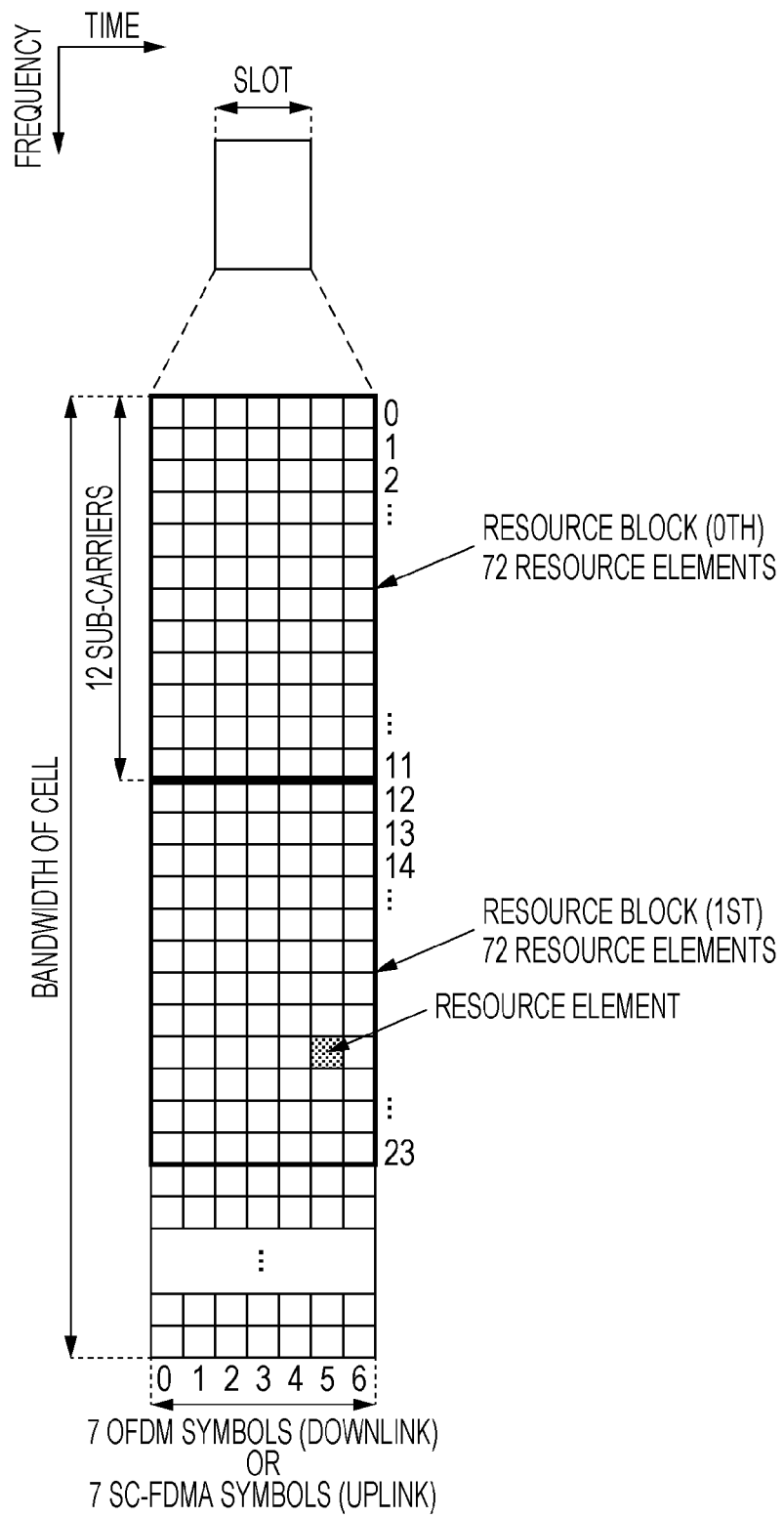
FIG. 3 is a diagram illustrating a slot structure according to the present embodiment.

FIG. 3 is a diagram illustrating a slot structure according to the present embodiment. In FIG. 3, a horizontal axis is a time axis, and a vertical axis is a frequency axis. Physical signals or physical channels transmitted in each slot are represented by a resource grid. In the downlink, the resource grid is defined by a plurality of subcarriers and a plurality of OFDM symbols. In the uplink, the resource grid is defined by a plurality of subcarriers and a plurality of SC-FDMA symbols. The number of subcarriers included in one slot depends on the uplink bandwidth or the downlink bandwidth of the cell. One slot includes seven OFDM symbols or seven SC-FDMA symbols. Each element in the resource grid is referred to as a resource element. Each resource element is identified by a subcarrier number and an OFDM symbol number or SC-FDMA symbol number.

The physical resource blocks are used to represent mapping of a certain physical channel (PDSCH, PUSCH, or the like) to resource elements. One physical resource block is defined by 7 OFDM symbols continuous in the time domain or a SC-FDMA symbol and 12 subcarriers contiguous in the frequency domain. Thus one physical resource block includes (7×12) resource elements. Furthermore, one physical resource block corresponds to one slot in the time domain and corresponds to 180 kHz in the frequency domain. The physical resource blocks are numbered starting with 0 in the frequency domain.

The physical channels and the physical signals transmitted in the respective sub-frames are described below.

Figure 4:
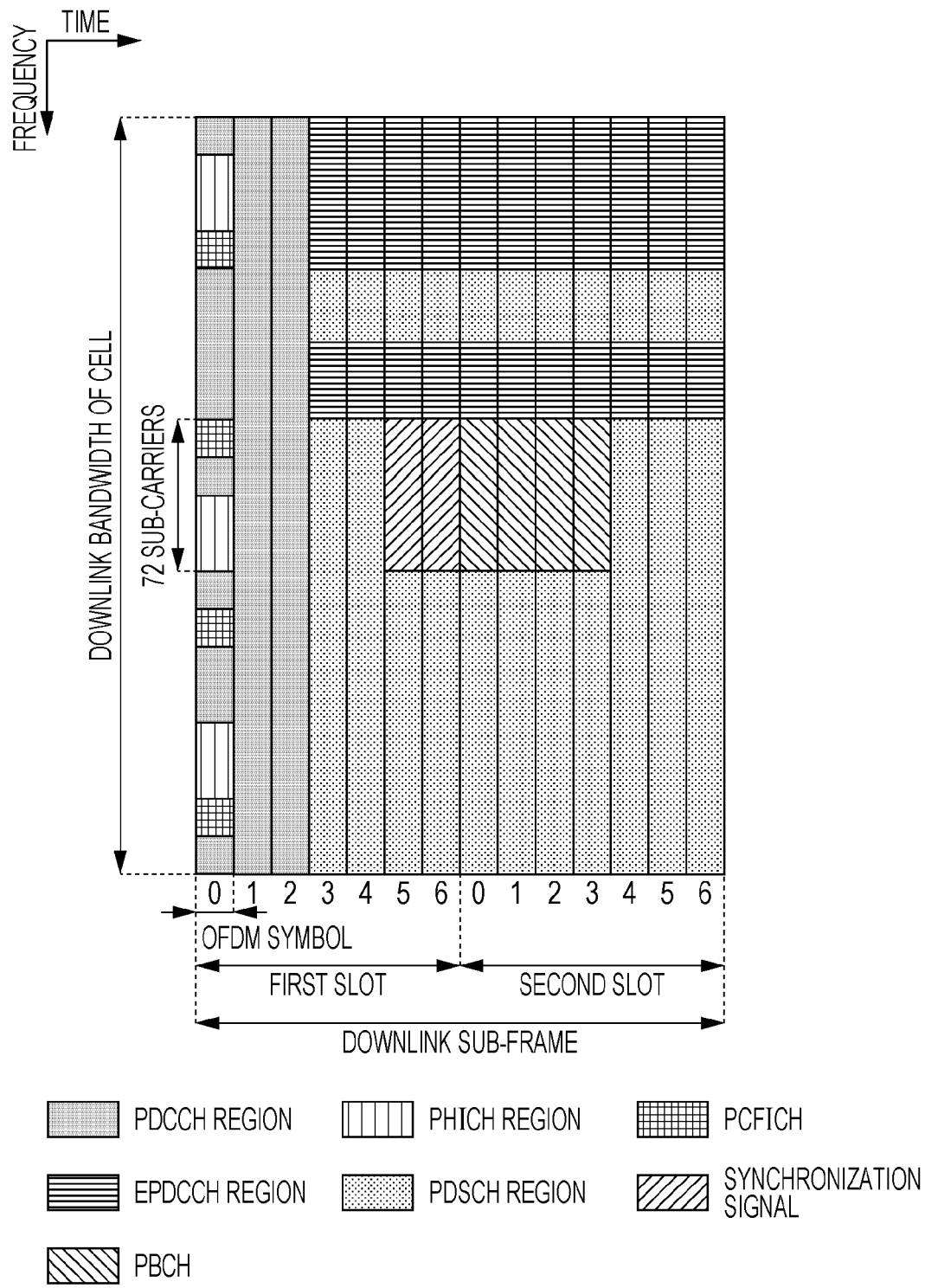
FIG. 4 is a diagram illustrating an example of allocation of physical channels and physical signals in a downlink sub-frame according to the preset embodiment.

FIG. 4 is a diagram illustrating an example of allocation of physical channels and physical signals in a downlink sub-frame according to an embodiment. In FIG. 4, a horizontal axis is a time axis, and a vertical axis is a frequency axis. The base station apparatus 3 is capable of transmitting downlink physical channels (PBCH, PCFICH, PHICH, PDCCH, EPDCCH, PDSCH) and downlink physical signals (synchronization signals, downlink reference signals) in a downlink sub-frame. Note that PBCH is transmitted only in sub-frame 0 in a radio frame. Note that synchronization signals are located only in sub-frames 0 and 5 in the radio frame.

In PDCCH regions, a plurality of PDCCHs are frequency-multiplexed and also time-multiplexed. In EPDCCH regions, a plurality of EPDCCHs are frequency-multiplexed or time-multiplexed. In PDSCH regions, a plurality of PDSCHs are frequency-multiplexed and also time-multiplexed. For example, PDCCHs are time-multiplexed with PDSCHs and EPDCCHs. For example, EPDCCHs are frequency-multiplexed with PDSCHs.

A subset of downlink sub-frames is set by a higher layer as MBSFN (Multicast/Broadcast Single Frequency Network) sub-frames. Downlink sub-frames other than the MBSFN sub-frames are non-MBSFN sub-frames. The base station apparatus 3 transmits, to the mobile station apparatus 1, information indicating MBSFN sub-frames for a serving cell.

Figure 5:
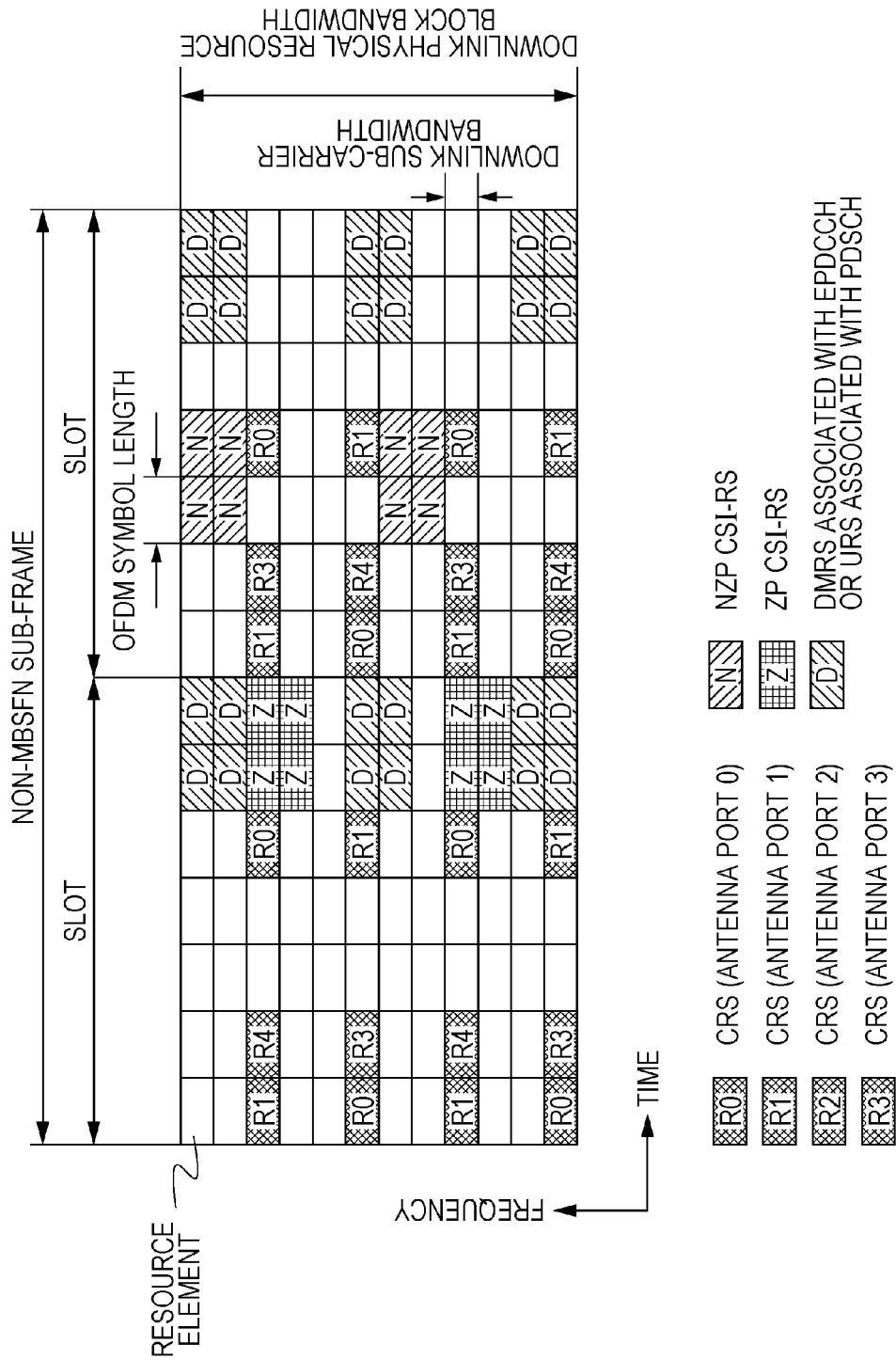
FIG. 5 is a diagram illustrating an example of allocation of downlink reference signals in a MBSFN sub-frame according to the present embodiment.
Figure 6:
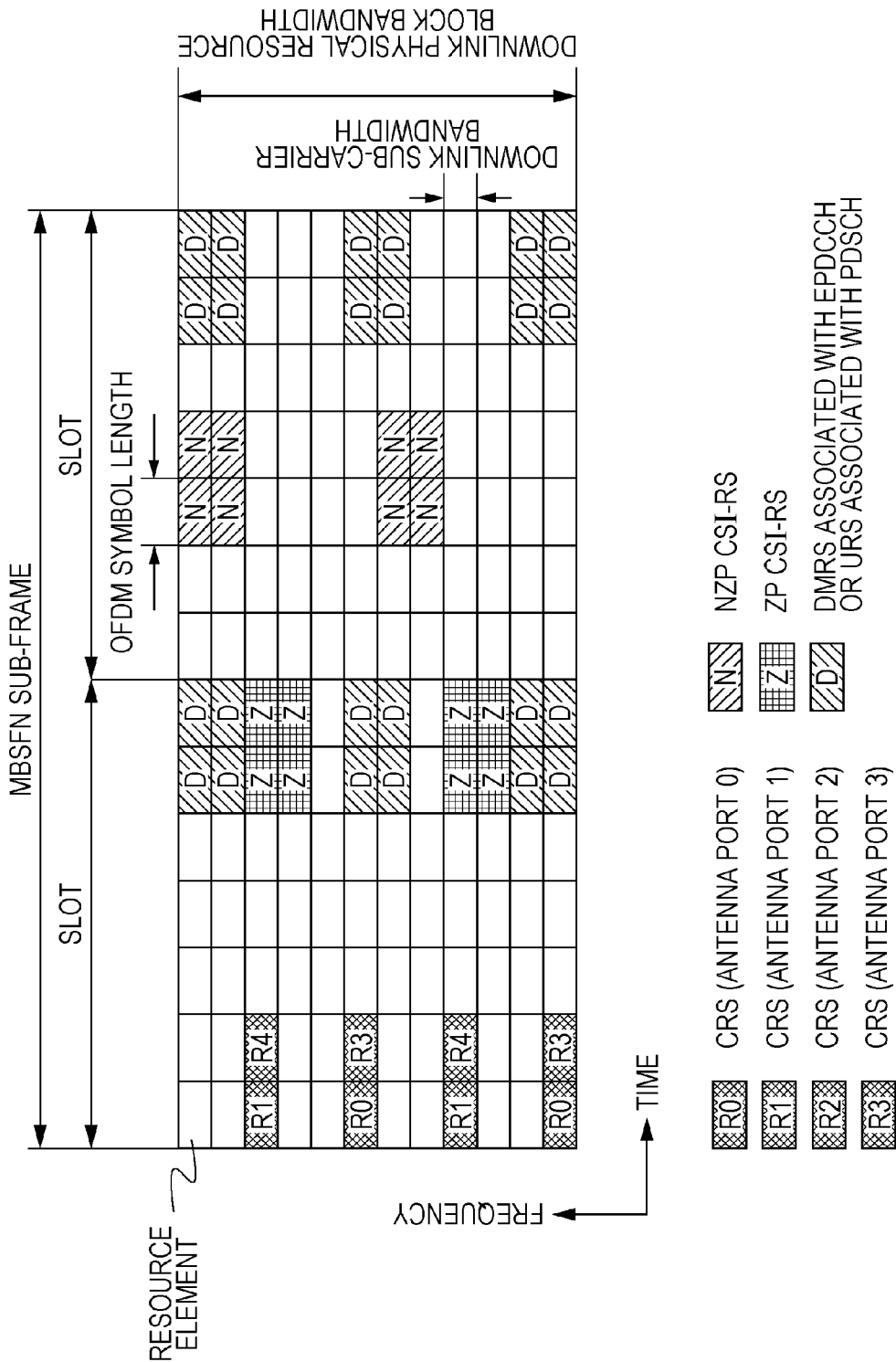
FIG. 6 is a diagram illustrating an example of allocation of downlink reference signals in a non-MBSFN sub-frame according to the present embodiment.

FIG. 5 is a diagram illustrating an example of allocation of downlink reference signals in a MBSFN sub-frame according to the present embodiment. FIG. 6 is a diagram illustrating an example of allocation of downlink reference signals in a non-MBSFN sub-frame according to the present embodiment. In FIG. 5 and FIG. 6, a horizontal axis is a time axis, and a vertical axis is a frequency axis. FIG. 5 and FIG. 6 each represent two physical resource blocks continuous in the time domain.

In FIG. 5 and FIG. 6, rectangles respectively labeled R0, R1, R2, and R4 denote resource elements in which CRSs are allocated. Rectangles labeled N denote resource elements in which NZP CSI-RSs are allocated. Rectangles labeled Z denote resource elements in which ZP CSI-RSs are allocated. Rectangles labeled D denote DMRSs associated with EPDCCH or URS associated with PDSCH. PDSCH and EPDCCH are allocated in resource elements other than resource elements in which downlink reference signals (CRS, ZP CSI-RS, NZP CSI-RS, URS/DM RS) are allocated/set.

In the MBSFN sub-frame, CRS is transmitted using only a first OFDM symbol and a second OFDM symbol.

Figure 7:
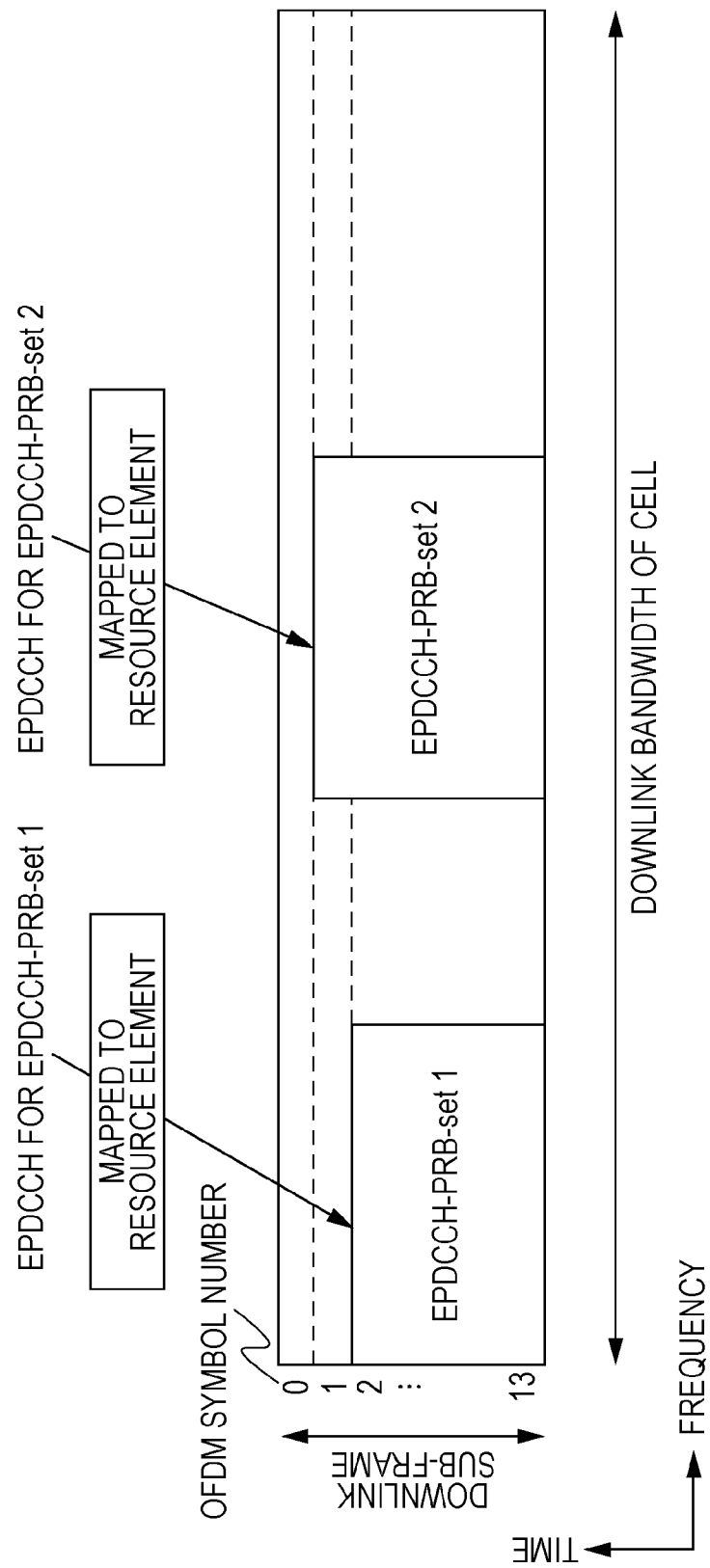
FIG. 7 is a diagram illustrating an example of an EPDCCH-PRB-set according to the present embodiment.

FIG. 7 is a diagram illustrating an example of an EPDCCH-PRB-set according to the present embodiment. In FIG. 7, a horizontal axis is a frequency axis and a vertical axis is a time axis. The base station apparatus 3 sets two EPDCCH-PRB-sets to the mobile station apparatus 1. Each EPDCCH-PRB-set is a set of physical resource blocks including resource candidates for use by the mobile station apparatus 1 to monitor EPDCCH. The base station apparatus 3 transmits, to the mobile station apparatus 1, information indicating a plurality of physical resource blocks forming the EPDCCH-PRB-set.

The base station apparatus 3 is capable of setting an OFDM symbol with which the allocation of EPDCCHs is started, individually for each of the EPDCCH-PRB-sets. In FIG. 7, an OFDM symbol with which the allocation of EPDCCHs for the EPDCCH-PRB-set 1 is started is 2, while an OFDM symbol with which the allocation of EPDCCHs for the EPDCCH-PRB-set 2 is started is 1.

A virtual cell identity for EPDCCH may be set individually for each EPDCCH-PRB-set. The virtual cell identity for EPDCCH is a parameter used to generate a pseudo random sequence used in scrambling EPDCCH. The virtual cell identity is also referred to as a scrambling identity or a DMRS scrambling sequence initialization parameter.

EPDCCH symbols are scrambled by the pseudo random sequence. In a case where a virtual cell identity is set for EPDCCH, the pseudo random sequence is generated based on the virtual cell identity for EPDCCH. In a case where a virtual cell identity is not set for EPDCCH, the pseudo random sequence is generated based on a physical layer cell identity in the serving cell. In the case where a virtual cell identity is not set for EPDCCH, a value of the physical layer cell identity may be set to the virtual cell identity.

DMRS corresponding to EPDCCH is generated based on a virtual cell identity set for an EPDCCH-PRB-set associated with the DMRS.

A candidate for a resource used by the mobile station apparatus 1 to monitor EPDCCH is referred to as an EPDCCH candidate. Monitoring refers to trying to decode EPDCCH. The EPDCCH-PRB-set is also referred to as an EPDCCH set. The base station apparatus 3 maps EPDCCH to a single PDCCH candidate. Note that in the frequency domain, a certain EPDCCH-PRB-set may overlap with another EPDCCH-PRB-set.

EPDCCH and the EPDCCH candidate each include one or a plurality of ECCEs (Enhanced Control Channel Elements). The ECCE includes four EREGs (Enhanced Resource Element Groups). EREG includes nine resource elements.

Figure 8:
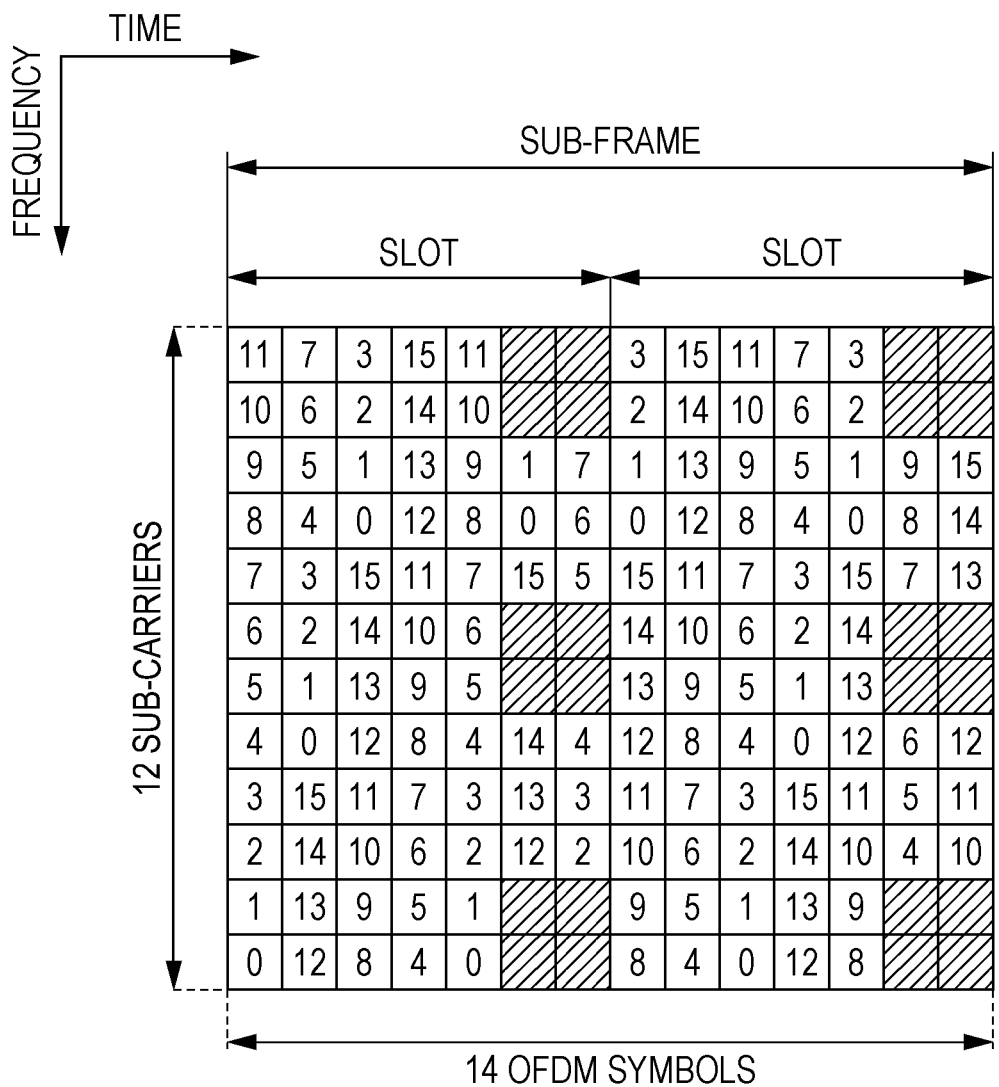
FIG. 8 is a diagram illustrating an example of a structure of EREG according to the present embodiment.

FIG. 8 is a diagram illustrating an example of a structure of EREG according to an embodiment. In FIG. 8, a horizontal axis is a time axis, and a vertical axis is a frequency axis. FIG. 8 illustrates two physical resource blocks continuous in the time domain in a sub-frame. Two physical resource blocks continuous in the time domain in a sub-frame are referred to as a physical resource block pair. In FIG. 9, the physical resource block pair includes 16 EREGs. The physical resource block pair includes four ECCEs.

In FIG. 8, each EREG includes resource elements other than resource elements in which DMRS associated with EPDCCH is allocated. In FIG. 8, rectangles each labeled with a number i denote resource elements forming an EREG i.

Note that EPDCCH symbols are allocated in resource elements other than resource elements in which CRS/NZP CSI-RS to which an EPDCCH-PRB-set corresponds or ZP CSI-RS set for a serving cell are allocated.

CRS/NZP CSI-RS to which EPDCCH-PRB-sets correspond may be set individually for each EPDCCH-PRB-set. In a case where CRS/NZP CSI-RS to which EPDCCH-PRB-sets correspond is not set, the CRS/NZP CSI-RS to which the EPDCCH-PRB-sets corresponds may be given by CRS/NZP CSI-RS for a serving cell.

Resource elements used to transmit CRS for a serving cell are determined based on the physical layer cell identity of the serving cell. Information representing the number of antenna ports used in transmitting CRS for a serving cell is mapped to BCH and is transmitted on PBCH.

Resource elements used to transmit CRS corresponding to an EPDCCH-PRB-set is given by information representing the number of antenna ports used to transmit the CRS corresponding to the EPDCCH-PRB-set, a frequency shift representing a resource element number used to transmit the CRS corresponding to the EPDCCH-PRB-set, and information indicating an MBSFN sub-frame corresponding to the EPDCCH-PRB-set.

The mobile station apparatus 1 maps EPDCCH symbols to resource elements assuming that CRSs are allocated only to the first OFDM symbol and the second OFDM symbol, in a sub-frame indicated by the information indicating the MBSFN sub-frame corresponding to the EPDCCH-PRB-set. That is, the information indicating the MBSFN sub-frame corresponding to the EPDCCH-PRB-set is information used to map EPDCCH to resource elements. The MBSFN sub-frames in the serving cell are specified by the information specifying the MBSFN sub-frames for the serving cell.

For example, the base station apparatus 3 transmits, to the mobile station apparatus 1, information specifying MBSFN sub-frame for the serving cell, information specifying the MBSFN sub-frame for the EPDCCH-PRB-set 1, and information specifying the MBSFN sub-frame for the EPDCCH-PRB-set 2.

FIG. 9 is a table representing EREGs corresponding to ECCEs in EPDCCH-PRB-sets. In FIG. 9, the EPDCCH-PRB-set 1 includes physical resource block pairs {0, 1, 2, 3} and the EPDCCH-PRB-set 2 includes physical resource block pairs {2, 3}. In FIG. 9, the EPDCCH-PRB-set 1 includes 16 ECCEs and the EPDCCH-PRB-set 2 includes 8 ECCEs. The ECCEs are numbered individually for each EPDCCH-PRB-set. The EREGs are numbered individually for each physical resource block pair.

In FIG. 9, one ECCE includes four EREGs in one PRB. For example, ECCE 0 in EPDCCH-PRB-set 1 includes EREGs 0, 4, 8, and 12 in PRB 0. For example, ECCE 0 in EPDCCH-PRB-set 2 includes EREGs 0, 4, 8, and 12 in PRB 2.

Note that the present invention may also be applied to a case in which the ECCEs and the EREGs are configured differently from those described above.

EPDCCH/EPDCCH candidates correspond to one ECCE, two continuous ECCEs, four continuous ECCEs, or eight continuous ECCEs. The number of ECCEs corresponding to one EPDCCH/EPDCCH candidate is referred to as an aggregation level.

The mobile station apparatus 1 does not monitor all ECCE/EPDCCH candidates in the EPDCCH-PRB-set. A set of EPDCCH candidates in the EPDCCH-PRB-set monitored by the mobile station apparatus 1 is referred to as an EPDCCH USS (UE-specific Search Space).

EPDCCH USSs are defined individually for each serving cell. For example, an EPDCCH USS for a primary cell and an EPDCCH USS for a secondary cell are defined individually. The mobile station apparatus 1 monitors, in EPDCCH USSs in a serving cell, DCI formats used in scheduling of PDSCHs of at least this serving cell. The mobile station apparatus 1 may monitor, in EPDCCH USSs in a serving cell, DCI formats used in scheduling of PUSCHs of this serving cell.

Note that the mobile station apparatus 1 may monitor such that DCI formats used in scheduling of PDSCHs of a certain serving cell are monitored in a cell different from the above-described certain serving cell. In this case, an EPDCCH USS for the certain serving cell is defined in the cell different from the above-described certain serving cell. That is, a plurality of EPDCCH USSs for a plurality of serving cells may be defined for one serving cell.

A carrier indicator may be included in a DCI format transmitted in one serving cell in which a plurality of EPDCCH USSs for a plurality of serving cells are defined. The carrier indicator is information indicating a serving cell corresponding to a DCI format.

An EPDCCH USS for a serving cell is defined individually for each EPDCCH-PRB-set. An EPDCCH USS for a serving cell is defined individually for each aggregation level.

FIG. 10 is a table illustrating an example of EPDCCH USS according to the present embodiment. FIG. 10 illustrates an example in which an EPDCCH USS for a primary cell and an EPDCCH USS for one secondary cell are defined in a primary cell. In FIG. 10, it is assumed that the EPDCCH-PRB-sets and the ECCEs are configured as illustrated in FIG. 9. In FIG. 10, a column "the number of EPDCCH candidates" indicates the number of EPDCCH candidates included in an EPDCCH USS.

For example, in FIG. 10, the aggregation level of the EPDCCH-PRB-set 1 is 1, and the EPDCCH USS corresponding to the primary cell includes four EPDCCH candidates. The four EPDCCH candidates are an EPDCCH candidate including ECCE 0, an EPDCCH candidate including ECCE 1, an EPDCCH candidate including ECCE 2, and an EPDCCH candidate including ECCE 3.

For example, in FIG. 10, the aggregation level of the EPDCCH-PRB-set 1 is 2, and the EPDCCH USS corresponding to the primary cell includes four EPDCCH candidates. The four EPDCCH candidates are EPDCCH candidates including ECCE 6 and ECCE 7, EPDCCH candidates including ECCE 8 and ECCE 9, EPDCCH candidates including ECCE 10 and ECCE 11, and EPDCCH candidates including ECCE 12 and ECCE 13.

The number of EPDCCH candidates included in the USS corresponding to each EPDCCH-PRB-set may be determined based on the number of physical resource block pairs included in the EPDCCH-PRB-set.

The ECCE numbers of ECCEs included in the USS may be determined based on C-RNTI and slot numbers in a radio frame.

Figure 11:
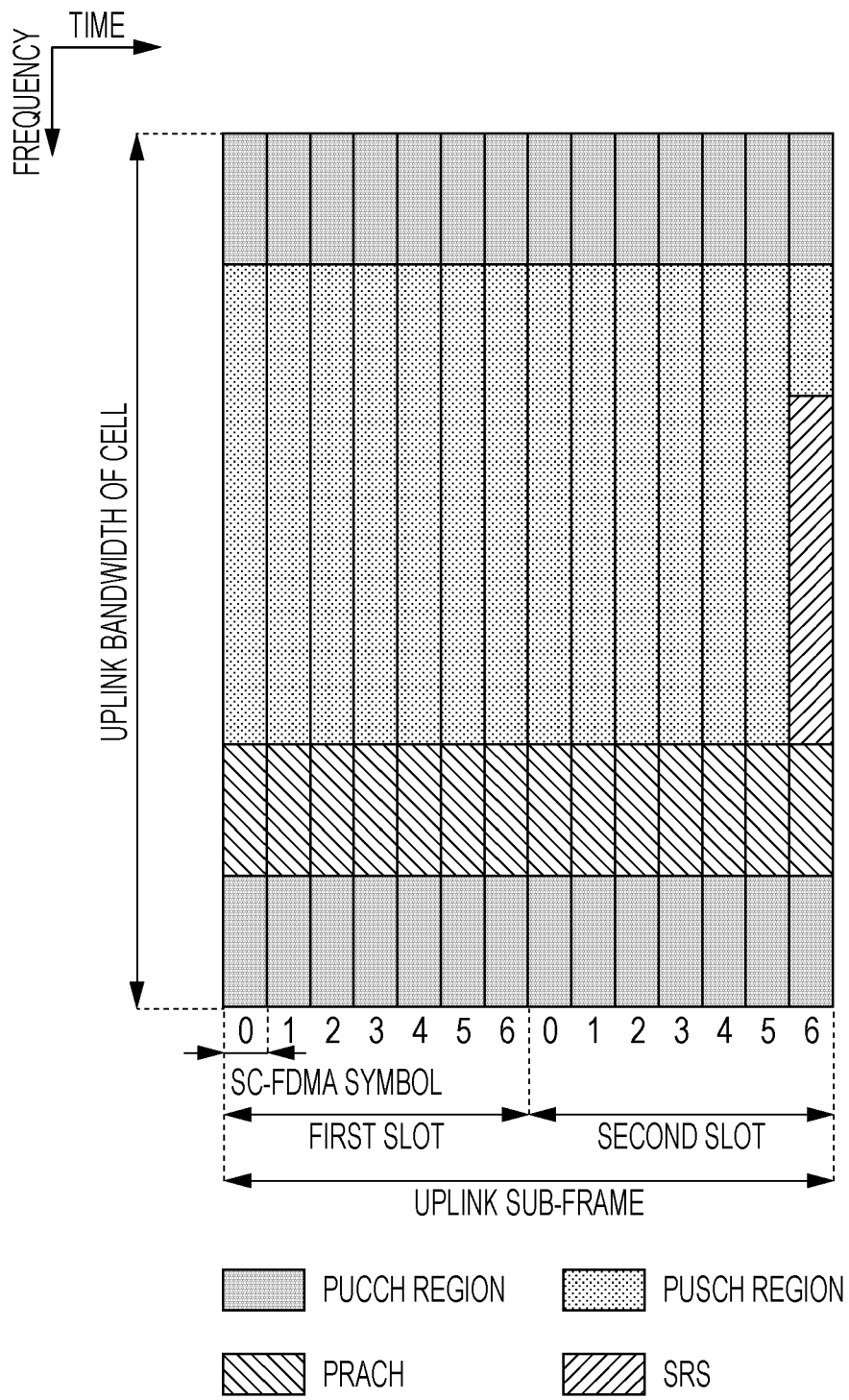
FIG. 11 is a diagram illustrating an example of allocation of physical channels and physical signals in an uplink sub-frame according to the present embodiment.

FIG. 11 is a diagram illustrating an example of allocation of physical channels and physical signals in an uplink sub-frame according to the present embodiment. The mobile station apparatus 1 is capable of transmitting, in an uplink sub-frame, uplink physical channels (PUCCH, PUSCH, PRACH) and uplink physical signals (DMRS, SRS).

In PUCCH regions, a plurality of PUCCHs transmitted by a plurality of mobile station apparatuses 1 are multiplexed in frequency, time, and code. Each mobile station apparatus 1 is capable of transmitting one PUCCH in one uplink sub-frame. In PUSCH regions, a plurality of PUSCHs are multiplexed in frequency and space. Each mobile station apparatus 1 is capable of transmitting one PUSCH in one uplink sub-frame in one cell. PUCCHs and PUSCHs are frequency-multiplexed. Each mobile station apparatus 1 is capable of transmitting one PUSCH and one PUCCH simultaneously in one uplink sub-frame in one cell. PRACHs are allocated in one sub-frame or over two sub-frames. Furthermore, a plurality of PRACHs transmitted by a plurality of mobile station apparatuses 1 are code-multiplexed. Each mobile station apparatus 1 does not simultaneously transmit a PRACH and another uplink signal in one cell.

An SRS is transmitted using a last SC-FDMA symbol in an uplink sub-frame. The mobile station apparatus 1 does not simultaneously transmit an SRS and PUCCH/PUSCH/PRACH in one SC-FDMA symbol in one cell. The mobile station apparatus 1 is capable of transmitting, in one uplink sub-frame in one cell, PUSCHs and/or PUCCHs using SC-FDMA symbols other than the last SC-FDMA symbol in this uplink sub-frame, and transmitting an SRS using the last SC-FDMA symbol in this uplink sub-frame. That is, in one uplink sub-frame in one cell, the mobile station apparatus 1 is capable of simultaneously transmitting an SRS and PUSCH/

PUCCH. Note that DMRSs are time-multiplexed with PUCCHs or PUSCHs. For simplicity of illustration, DMRSs are not shown in FIG. 5.

Next, PUCCH resources are described below.

Figure 12:
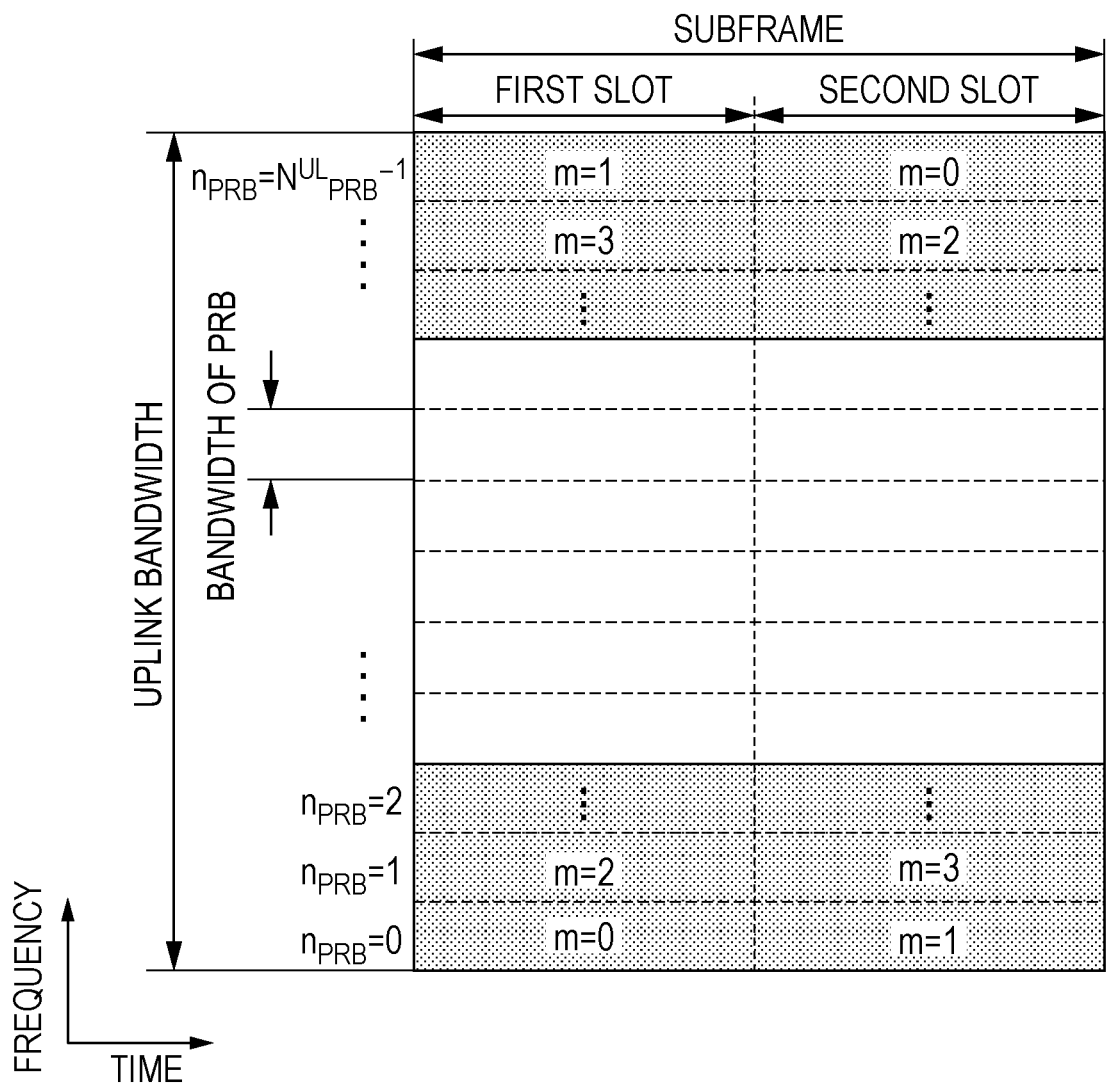
FIG. 12 is a diagram illustrating physical resource blocks in which PUCCHs are allocated according to the present embodiment.

FIG. 12 is a diagram illustrating physical resource blocks in which PUCCHs are allocated according to the present embodiment. In FIG. 12, a horizontal axis is a time axis, and a vertical axis is a frequency axis. In FIG. 12, nPRB is a physical resource block number in the frequency domain, $N^{UL}_{PRB}$ is the number of physical resource blocks included in an uplink bandwidth, and m is a number for identifying a physical resource block in which a PUCCH is allocated.

One PUCCH is allocated over two physical resource blocks. That is, one PUCCH is allocated in one physical resource block in a first slot and one physical resource block in a second slot. The one physical resource block in the first slot and the physical resource block in the second slot are symmetric about a center frequency of the uplink band.

Note that in the two physical resource blocks, a plurality of PUCCHs are code-multiplexed. For example, in two physical resource blocks with m=k, 36 PUCCHs are code-multiplexed. For example, PUCCH resources with PUCCH resource numbers from (36×k) to (36×k+35) are allocated in two physical resource blocks with m=k.

In the present embodiment, in a case where PUCCHs are transmitted using a plurality of antenna ports, different PUCCH resources are allocated to the respective antenna ports and the same HARQ-ACK information is transmitted via the respective antenna ports.

Next, a method of generating PUCCH symbols is described below.

PUCCHs are spread using a cyclic shift α and an orthogonal code w(i). That is, a PUCCH resource is identified by a combination of a number m, the cyclic shift α, and the orthogonal sequence w(i).

In one PUCCH resource, the cyclic shift α corresponds to one of $2\pi \cdot n^{(p)}_{CS}/12$ ($n^{(p)}_{CS}$=0, 1, . . . , 11). $n^{(p)}_{CS}$ is a cyclic shift index. Furthermore, in one PUCCH resource, w(i) corresponds to one of [+1 +1 +1 +1] and [+1 −1 +1 −1] and [+1 −1 −1 +1].

FIG. 13 is a diagram illustrating a correspondence between a PUCCH resource index and a PUCCH resource. In FIG. 13, m is a number for identifying a physical resource block to which a PUCCH resource corresponds. $n^{(1,p)}_{PUCCH}$ is an index of a PUCCH resource corresponding to an antenna port p, $n^{(p)}_{OC}$ an orthogonal sequence index for the antenna port p, and $n^{(p)}_{CS}$ is a cyclic shift index for the antenna port p. For example, in FIG. 13, in the case of a PUCCH resource with an index of 1, m is 0, the orthogonal sequence index $n^{(p)}_{OC}$ is 0, and the cyclic shift index $n^{(p)}_{OC}$ is 1.

Figure 14:
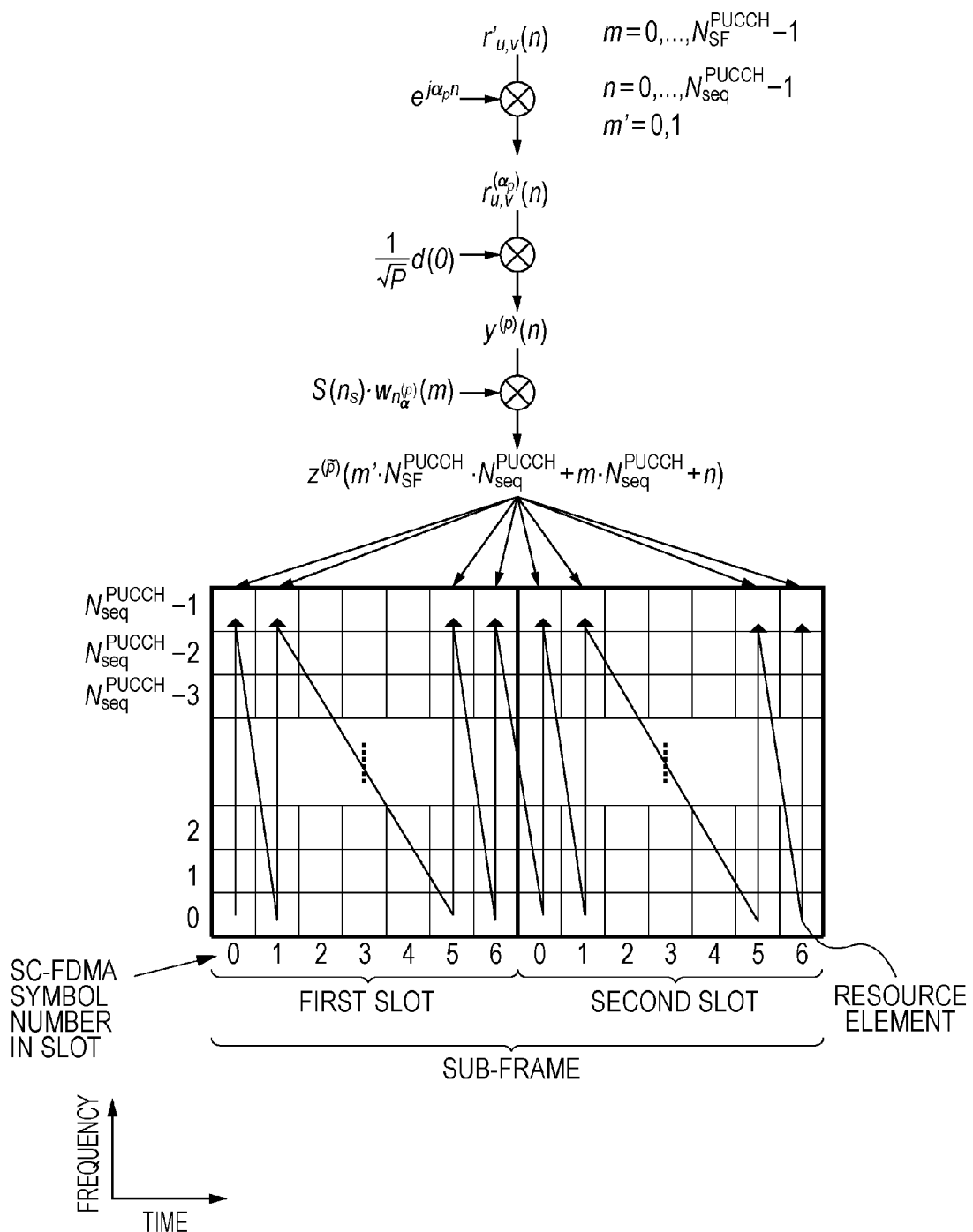
FIG. 14 is a diagram illustrating a method of generating PUCCHs according to the present embodiment.

FIG. 14 is a diagram illustrating a method of generating PUCCHs according to the present embodiment. In FIG. 14, $N^{PUCCH}_{SF}$ is a spreading factor of the orthogonal sequence w(i) in one slot, and is equal to 4. In FIG. 14, $N^{PUCCH}_{seq}$ is the number of subcarriers included in a band width of one PUCCH, and is equal to 12. In FIG. 14, p is an antenna port number, and P is the number of antenna ports used in transmission of PUCCHs.

First, the mobile station apparatus 1 determines a sequence $r'_{u,v}(n)$ where u is sequence group number. In a case where a value of the virtual cell identity for PUCCH has been received, the mobile station apparatus 1 determines the value of u based on at least the virtual cell identity. On the other hand, in a case where a value of the virtual cell identity for PUCCH has not been received, the mobile station apparatus 1 determines the value of u based on at least the physical layer cell identity. v is a sequence number, which is always equal to 0 for PUCCHs. Note that the virtual cell identity for PUCCHs and the virtual cell identity for EPDCCH are set individually.

The base station apparatus 3 may determine the value of the virtual cell identity for PUCCHs for each mobile station apparatus 1 and may transmit the information indicating the determined value of the virtual cell identity to each mobile station apparatus 1. Note that the base station apparatus 3 may not transmit, to the mobile station apparatus 1, the information indicating the value of the virtual cell identity for PUCCHs. The mobile station apparatus 1 sets the value of the virtual cell identity for the PUCCHs based on the information (signaling) indicating the value of the virtual cell identity for the PUCCHs.

Note that the sequence group number u may be hopped for each slot based on a pseudo random sequence. The base station apparatus 3 transmits information indicating whether hopping of the sequence group number u is enabled or not. The mobile station apparatus 1 makes a determination, based on the information indicating whether hopping of the sequence group number u is enabled or not, as to whether or not to hop the sequence group number u.

The mobile station apparatus 1 and the base station apparatus 3 respectively store the sequence $r'_{u,v}(n)$ with a sequence length of 12 defined for each sequence group number, and read (generate) a sequence $r'_{u,v}(n)$ corresponding to the determined u.

The mobile station apparatus 1 determines the sequence $r^{(\alpha_p)}_{u,v}(n)$ by multiplying the sequence $r'_{u,v}(n)$ by $e^{j \alpha_p n}$ where $\alpha_p$ is the amount of phase rotation for each subcarrier. The phase rotation of the sequence $r'_{u,v}(n)$ in the frequency domain corresponds to the cyclic shift of the SC-FDMA symbol of the PUCCH in the time domain. Therefore, in the present embodiment, $\alpha_p$ is also referred to simply as a cyclic shift.

The mobile station apparatus 1 generates a block $y^{(p)}(n)$ of a modulation symbol by multiplying the sequence $r^{(\alpha_p)}_{p,v}(n)$ by $1/\sqrt{P}$ and d(0). d(0) is a modulation symbol generated by performing BPSK (Binary Phase Shift Keying) modulation or QPSK (Quadrature Phase Shift Keying) modulation on each 1-bit or 2-bit HARQ-ACK.

The mobile station apparatus 1 multiplies the block $y^{(p)}(n)$ of the modulation symbol by $S(n_s)$ and spreads the block $y^{(p)}(n)$ of the modulation symbol by $S(n_s)$ multiplied by $S(n_s)$ with the orthogonal sequence $w_{n_{(p)OC}}(m)$ thereby generating a block $z^{(p)}(*)$ of the modulation symbol. As for $S(n_s)$, 1 or $e^{j\pi/2}$ is selected based on the PUCCH resource number.

The mobile station apparatus 1 maps the block $z^{(p)}(*)$ of the modulation symbol to the two physical resource blocks m to which the PUCCH corresponds. The mobile station apparatus 1 maps, in a sub-frame, the block $z^{(p)}(*)$ of the modulation symbol to SC-FDMA symbols of {0, 1, 5, 6} in the first slot and then to SC-FDMA symbols of {0, 1, 5, 6} in the second slot. Note that in a single SC-FDMA symbol, $z^{(p)}(*)$ are mapped sequentially to subcarriers in ascending order of subcarrier numbers.

Next, a method of generating a DMRS for a PUCCH is described below.

Figure 15:
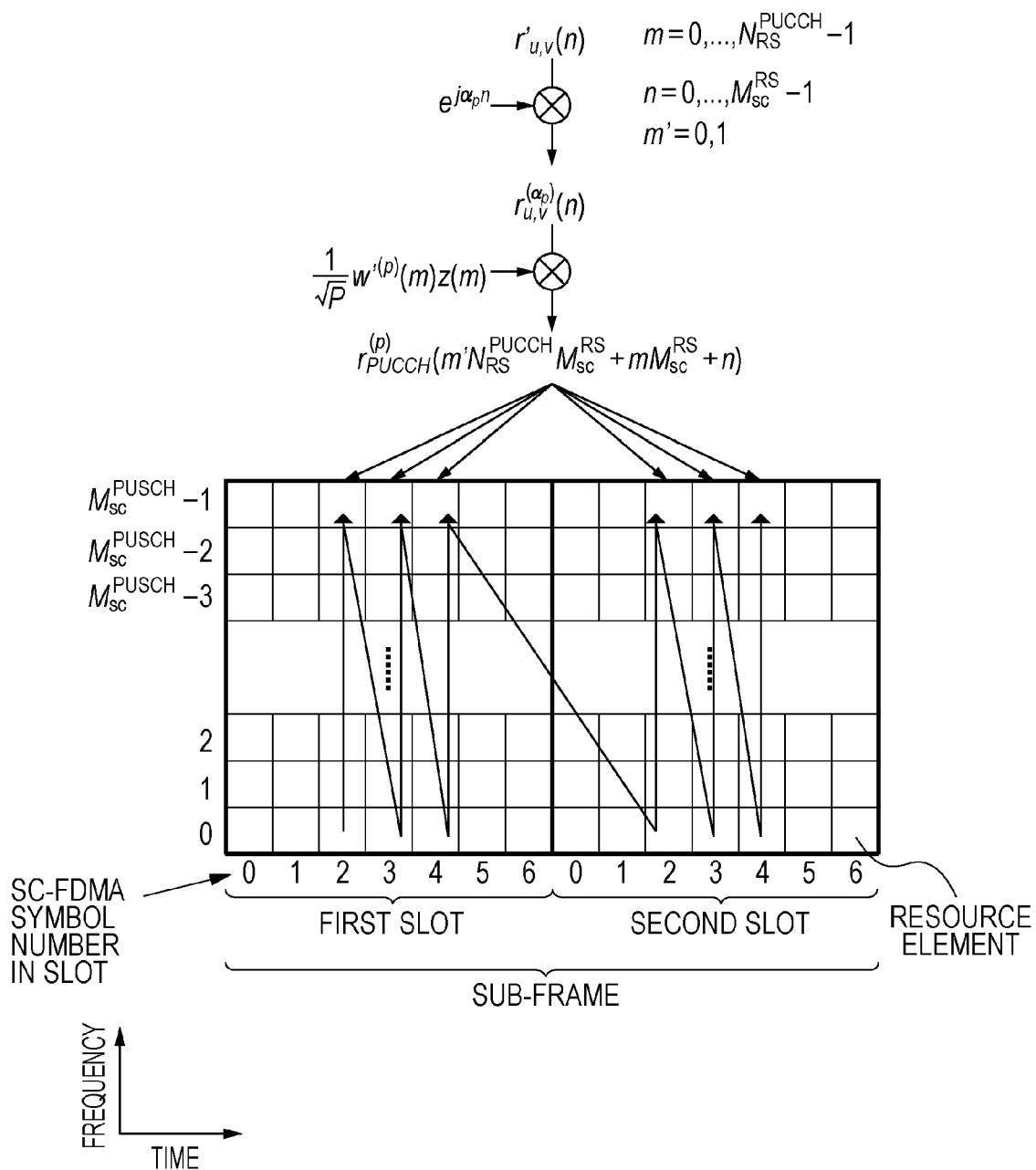
FIG. 15 is a diagram illustrating a method of generating a DMRS sequence for a PUCCH according to the present embodiment.

FIG. 15 is a diagram illustrating a method of generating a DMRS sequence for a PUCCH according to the preset embodiment. In FIG. 15, $N^{PUCCH}_{RS}$ is the number of SC-FDMA symbols used in transmission of a DMRS for a PUCCH for each single slot, and is 3. In FIG. 15, $M^{RS}_{SC}$ is the length of a reference signal sequence, and is 12.

In FIG. 15, the mobile station apparatus 1 generates a sequence $r^{(\alpha_p)}_{u,v}(n)$ in a similar manner to the PUCCH. That is, in a case where a virtual cell identity for a PUCCH has not been received, the mobile station apparatus 1 generates a sequence $r^{(\alpha_p)}{}_{u,v}(n)$ based on at least a physical layer cell identity. In a case where a virtual cell identity for a PUCCH has been received, the mobile station apparatus 1 generates a sequence $r^{(\alpha_p)}{}_{u,v}(n)$ based on at least the virtual cell identity.

Furthermore, the mobile station apparatus 1 multiplies the sequence $r^{(\alpha_p)}{}_{u,v}(n)$ by $1/\sqrt{P}$, $w'^{(p)}(m)$, and $z(m)$ thereby generating a sequence $r^{(p)}{}_{PUCCH}(*)$. $w'^{(p)}(m)$ is an orthogonal sequence for a DMRS of a PUCCH. $z(m)$ is always equal to 1 for the DMRS of the PUCCH used to transmit only HARQ-ACK. That is, in a case where the DMRS of the PUCCH used only in transmission of HARQ-ACK is generated, it may not be necessary to perform the process of multiplying $z(m)$.

The mobile station apparatus 1 maps, in a sub-frame, the sequence $r^{(p)}{}_{PUCCH}(*)$ to SC-FDMA symbols of {2, 3, 4} in the first slot and then to {2, 3, 4} in the second slot. Note that in a single SC-FDMA symbol, $r^{(p)}{}_{PUCCH}(*)$ are mapped sequentially to subcarriers in ascending order of subcarrier numbers.

Note that in a DMRS corresponding to a single PUCCH resource, $w'(i)$ corresponds to one of [1 1 1] and [1 $e^{j2\pi/3}$ $e^{j4\pi/3}$] and [1 $e^{j4\pi/3}$ $e^{j2\pi/3}$].

Next, a correspondence between EPDCCH resources and PUCCH resources is described below.

In the present embodiment, the mobile station apparatus 1 determines a PUCCH resource used for transmission of HARQ-ACK corresponding to a transport block received on a PDSCH on the basis of at least $N_{ECCE,q}$, $N^{(e1)}{}_{PUCCH,q}$ and $\Delta_{ARO}$.

$n_{ECCE}$ is a first ECCE number used in transmission of a DCI format for use in scheduling of a PDSCH. That is, $n_{ECCE}$ is a lowest ECCE index of EPDCCH/EPDCCH candidates used to transmit the DCI format for use in scheduling of the PDSCH. For example, in a case where ECCE2 and ECCE3 are used for transmission of a DCI format for use in scheduling of a PDSCH, $n_{ECCE}$ is 2.

$N^{(e1)}{}_{PUCCH,q}$ is a parameter/offset value of a higher layer which is set for EPDCCH-PRB-set q. In a case where the mobile station apparatus 1 detects a DCI format in EPDCCH-PRB-set q, the mobile station apparatus 1 determines a PUCCH resource using a parameter/offset value $N^{(e1)}{}_{PUCCH,q}$ to which EPDCCH-PRB-set q corresponds.

$\Delta_{ARO}$ is a parameter/offset value determined based on information included in the DCI format used in scheduling of the PDSCH.

Furthermore, based an antenna port number used in transmission of an EPDCCH to which the DCI format used in scheduling of the PDSCH is mapped, a PUCCH resource used in transmission of a HARQ-ACK to a transport block received on the PDSCH may be determined.

A first embodiment according to the present invention is described below.

In a case where an EPDCCH candidate for EPDCCH-PRB-set 1 and an EPDCCH candidate for an EPDCCH-PRB-set 2 both correspond to the same EREG and the same DCI format is monitored in both the EPDCCH candidate for EPDCCH-PRB-set 1 and the EPDCCH candidate for EPDCCH-PRB-set 2, the mobile station apparatus 1 has a problem that the mobile station apparatus 1 cannot determine whether the DCI format is transmitted using the EPDCCH-PRB-set 1 or the EPDCCH-PRB-set 2, and thus the mobile station apparatus 1 cannot determine whether a parameter $N^{(e1)}{}_{PUCCH,1}$ for the EPDCCH-PRB-set 1 or a parameter $N^{(e1)}{}_{PUCCH,2}$ for the EPDCCH-PRB-set 2 is to be used in determination of the PUCCH resource.

For example, in FIG. 10, the mobile station apparatus 1 monitors EPDCCH candidates including ECCE12 and ECCE13 in the EPDCH-PRB-set 1 and EPDCCH candidates including ECCE4 and ECCE5 in the EPDCH-PRB-set 2.

According to FIG. 9, the EPDCCH candidates including ECCE12 and ECCE13 in the EPDCH-PRB-set 1 and the EPDCCH candidates including ECCE4 and ECCE5 in the EPDCH-PRB-set 2 both correspond to EREGs 0, 1, 4, 5, 8, 9, 12, and 13 in a physical resource block pair 3. Therefore, in a case where the mobile station apparatus 1 detects a DCI format in EREGs 0, 1, 4, 5, 8, 9, 12, and 13, the mobile station apparatus 1 cannot determine whether the detected DCI format corresponds to the EPDCH-PRB-set 1 or the EPDCH-PRB-set 2.

The mobile station apparatus 1 according to the first embodiment determines whether or not to regard a DCI format as being transmitted only on an EPDCCH allocated in the EPDCCH-PRB-set 1 at least based on whether it is set to monitor the same DCI format for the same serving cell in an EPDCCH USS for the EPDCCH-PRB-set 1 and in an EPDCCH USS for the EPDCCH-PRB-set 2 in a serving cell.

The mobile station apparatus 1 according to the first embodiment determines whether or not to regard a DCI format as being transmitted only on an EPDCCH allocated in the EPDCCH-PRB-set 1, at least based on whether it is set so as to monitor the same DCI format for the same serving cell in both an EPDCCH candidate of the EPDCCH-PRB-set 1 and an EPDCCH candidate of the EPDCCH-PRB-set 2.

For example, the mobile station apparatus 1 according to the first embodiment includes a setting unit that sets an EPDCCH-PRB-set 1 and an EPDCCH-PRB-set 2, a reception unit that monitors a DCI format using an EPDCCH candidate of the EPDCCH-PRB-set 1 and an EPDCCH candidate of the EPDCCH-PRB-set 2 in a sub-frame of a serving cell, a selection unit that selects a parameter/offset value corresponding to the EPDCCH-PRB-set 1 or a parameter/offset corresponding to the EPDCCH-PRB-set 2 and selects a resource for a PUCCH based on the selected parameter/offset value, and a transmission unit that transmits HARQ-ACK using the selected PUCCH resource.

For example, in a case where an EREG to which an EPDCCH candidate of the EPDCCH-PRB-set 1 corresponds is the same as an EREG to which an EPDCCH candidate of the EPDCCH-PRB-set 2 corresponds and the mobile station apparatus 1 is set so as to monitor the same DCI format for the same serving cell in both the EPDCCH candidate of the EPDCCH-PRB-set 1 and the EPDCCH candidate of the EPDCCH-PRB-set 2, then the mobile station apparatus 1 assumes that the DCI format is transmitted only on the EPDCCH allocated in the EPDCCH-PRB-set 1, and in a case where the DCI format is detected in the EREG, the mobile station apparatus 1 determines a PUCCH resource using a parameter $N^{(e1)}{}_{PUCCH,1}$ for the EPDCCH-PRB-set 1. In this case, the base station apparatus 3 tries to receive HARQ-ACK using the PUCCH resource determined using the parameter $N^{(e1)}{}_{PUCCH,1}$ for the EPDCCH-PRB-set 1.

For example, in a case where an EREG to which an EPDCCH candidate of the EPDCCH-PRB-set 1 corresponds is the same as an EREG to which an EPDCCH candidate of the EPDCCH-PRB-set 2 corresponds and the mobile station apparatus 1 is set so as to monitor the same DCI format for different serving cells in each of the EPDCCH candidate of the EPDCCH-PRB-set 1 and the EPDCCH candidate of the EPDCCH-PRB-set 2, the mobile station apparatus 1 can determine, based on a carrier indicator included in the DCI format, which serving cell the DCI format corresponds to and which EPDCCH-PRB-set the DCI format corresponds to.

Thus the mobile station apparatus 1 can determine whether the detected DCI format corresponds to the EPDCH-PRB-set 1 or the EPDCH-PRB-set 2, and the mobile station apparatus 1 can efficiently transmit, using a PUCCH, a HARQ-ACK in response to a transport block transmitted on a PDSCH.

Next, a second embodiment according to the present invention is described below.

The mobile station apparatus 1 according to the second embodiment determines whether or not to regard a DCI format as being transmitted only on an EPDCCH allocated in the EPDCCH-PRB-set 1 based on at last whether or not a value of a virtual cell identity for the EPDCCH-PRB-set 1 is equal to a value of a virtual cell identity for the EPDCCH-PRB-set 2.

For example, the mobile station apparatus 1 according to the second embodiment includes a setting unit that sets an EPDCCH-PRB-set 1, an EPDCCH-PRB-set 2, a virtual cell identity for the EPDCCH-PRB-set 1, and a virtual cell identity for the EPDCCH-PRB-set 2, a reception unit that monitors a DCI format using an EPDCCH candidate of the EPDCCH-PRB-set 1 and an EPDCCH candidate of the EPDCCH-PRB-set 2 in a sub-frame of a serving cell, a selection unit that selects a parameter/offset value corresponding to the EPDCCH-PRB-set 1 or a parameter/offset corresponding to the EPDCCH-PRB-set 2 and selects a resource for a PUCCH based on the selected parameter/offset value, and a transmission unit that transmits HARQ-ACK using the selected PUCCH resource.

For example, in a case where an EREG to which an EPDCCH candidate of the EPDCCH-PRB-set 1 corresponds is the same as an EREG to which an EPDCCH candidate of the EPDCCH-PRB-set 2 corresponds, and the mobile station apparatus 1 is set so as to monitor the same DCI format for the same serving cell in both the EPDCCH candidate of the EPDCCH-PRB-set 1 and the EPDCCH candidate of the EPDCCH-PRB-set 2, and furthermore the value of the virtual cell identity for the EPDCCH-PRB-set 1 is equal to the value of the virtual cell identity for the EPDCCH-PRB-set 2, then the mobile station apparatus 1 assumes that the DCI format is transmitted only on the EPDCCH allocated in the EPDCCH-PRB-set 1, and in a case where the DCI format is detected in the EREG, the mobile station apparatus 1 determines a PUCCH resource using a parameter $N^{(e1)}_{PUCCH,1}$ for the EPDCCH-PRB-set 1. In this case, the base station apparatus 3 tries to receive HARQ-ACK using the PUCCH resource determined using the parameter $N^{(e1)}_{PUCCH,1}$ for the EPDCCH-PRB-set 1.

Note that in a case where the value of the virtual cell identity for the EPDCCH-PRB-set 1 is different from the value of the virtual cell identity for the EPDCCH-PRB-set 2, a pseudo random sequence with which to scramble the EPDCCH for the EPDCCH-PRB-set 1 is different from a pseudo random sequence with which to scramble the EPDCCH for the EPDCCH-PRB-set 2, and thus the mobile station apparatus 1 can determine whether the EPDCCH corresponds to the EPDCCH-PRB-set 1 or the EPDCCH-PRB-set 2.

Thus the mobile station apparatus 1 can determine whether the detected DCI format corresponds to the EPDCH-PRB-set 1 or the EPDCH-PRB-set 2, and thus the mobile station apparatus 1 can efficiently transmit, using a PUCCH, a HARQ-ACK in response to a transport block transmitted on a PDSCH.

Next, a third embodiment according to the present invention is described below.

The mobile station apparatus 1 according to the third embodiment determines whether or not to regard a DCI format as being transmitted only on an EPDCCH allocated in the EPDCCH-PRB-set 1 based on at last whether or not a resource element to which an EPDCCH candidate of the EPDCCH-PRB-set 1 corresponds is equal to a resource element to which an EPDCCH candidate of the EPDCCH-PRB-set 2 corresponds.

If an EREG to which an EPDCCH candidate of the EPDCCH-PRB-set 1 corresponds is the same as an EREG to which an EPDCCH candidate of the EPDCCH-PRB-set 2 corresponds, and if CRS, ZP CSI-RS and a OFDM symbol with which allocation of EPDCCHs starts corresponding to the EPDCCH-PRB-set 1 included in the EREG are the same as CRS, ZP CSI-RS and a OFDM symbol with which allocation of EPDCCHs starts corresponding to the EPDCCH-PRB-set 2 included in the EREG, then resource elements to which the EPDCCH candidate of the EPDCCH-PRB-set 1 corresponds is the same as resource elements to which the EPDCCH candidate of the EPDCCH-PRB-set 2 corresponds.

That is, in the mobile station apparatus 1 according to the third embodiment, in a case where an EREG to which an EPDCCH candidate of the EPDCCH-PRB-set 1 corresponds is the same as an EREG to which an EPDCCH candidate of the EPDCCH-PRB-set 2, the mobile station apparatus 1 determines whether or not to regard a DCI format as being transmitted only on an EPDCCH allocated in the EPDCCH-PRB-set 1 based on at least whether or not CRS and ZP CSI-RS and a OFDM symbol with which allocation of EPDCCHs starts corresponding to the EPDCCH-PRB-set 1 and included in the EREG are the same as CRS and ZP CSI-RS and a OFDM symbol with which allocation of EPDCCHs starts corresponding to the EPDCCH-PRB-set 2 and included in the EREG.

For example, the mobile station apparatus 1 according to the third embodiment includes a setting unit that sets an EPDCCH-PRB-set 1, an EPDCCH-PRB-set 2, a virtual cell identity for the EPDCCH-PRB-set 1, and a virtual cell identity for the EPDCCH-PRB-set 2, a reception unit that monitors a DCI format using an EPDCCH candidate of the EPDCCH-PRB-set 1 and an EPDCCH candidate of the EPDCCH-PRB-set 2 in a sub-frame of a serving cell, a selection unit that selects a parameter/offset value corresponding to the EPDCCH-PRB-set 1 or a parameter/offset corresponding to the EPDCCH-PRB-set 2 and selects a resource for a PUCCH based on the selected parameter/offset value, and a transmission unit that transmits HARQ-ACK using the selected PUCCH resource.

For example, in a case where a resource element to which an EPDCCH candidate of the EPDCCH-PRB-set 1 corresponds is the same as a resource element to which an EPDCCH candidate of the EPDCCH-PRB-set 2 corresponds, and the mobile station apparatus 1 is set so as to monitor the same DCI format for the same serving cell in both the EPDCCH candidate of the EPDCCH-PRB-set 1 and the EPDCCH candidate of the EPDCCH-PRB-set 2, and furthermore the value of the virtual cell identity for the EPDCCH-PRB-set 1 is equal to the value of the virtual cell identity for the EPDCCH-PRB-set 2, then the mobile station apparatus 1 assumes that the DCI format is transmitted only on the EPDCCH allocated in the EPDCCH-PRB-set 1, and in a case where the DCI format is detected in the EREG, the mobile station apparatus 1 determines a PUCCH resource using a parameter $N^{(e1)}_{PUCCH,1}$ for the EPDCCH-PRB-set 1. In this case, the base station apparatus 3 tries to receive HARQ-ACK using a PUCCH resource determined using a $N^{(e1)}_{PUCCH,1}$ for the EPDCCH-PRB-set 1.

Thus the mobile station apparatus 1 can determine whether the detected DCI format corresponds to the EPDCH-PRB-set 1 or the EPDCH-PRB-set 2, and thus the mobile station apparatus 1 can efficiently transmit, using a PUCCH, a HARQ-ACK in response to a transport block transmitted on a PDSCH.

Next, a fourth embodiment according to the present invention is described below.

In the base station apparatus 3 according to the fourth embodiment, in a case where a resource element to which an EPDCCH candidate of the EPDCCH-PRB-set 1 corresponds is the same as a resource element to which an EPDCCH candidate of the EPDCCH-PRB-set 2 corresponds, and the mobile station apparatus 1 is set so as to monitor the same DCI format for the same serving cell in both the EPDCCH candidate of the EPDCCH-PRB-set 1 and the EPDCCH candidate of the EPDCCH-PRB-set 2, and furthermore the value of the virtual cell identity for the EPDCCH-PRB-set 1 is equal to the value of the virtual cell identity for the EPDCCH-PRB-set 2, the base station apparatus 3 tries to receive the HARQ-ACK using a PUCCH resource determined using a parameter $N^{(e1)}_{PUCCH,1}$ for the EPDCCH-PRB-set 1 and a PUCCH resource determined using a parameter $N^{(e1)}_{PUCCH,2}$ for the EPDCCH-PRB-set 2. For example, the base station apparatus 3 according to the fourth embodiment measures power of a PUCCH resource determined using a parameter $N^{(e1)}_{PUCCH,1}$ for the PDCCH-PRB-set 1 and power of a PUCCH resource determined using a parameter $N^{(e1)}_{PUCCH,2}$ for the EPDCCH-PRB-set 2, and determines, based on the measured power, which one of PUCCH resources was used to transmit HARQ-ACK.

Thus, the base station apparatus 3 can receive, on a PUCCH, HARQ-ACK for transport block transmitted on a PDSCH without knowing which one of the PUCCH resources was used by the mobile station apparatus 1 to transmit the HARQ-ACK.

Next, a fifth embodiment according to the present invention is described below.

In the fifth embodiment, at least one of the first to third embodiments of the invention is applied to a case where an EREG to which an EPDCCH candidate of an EPDCCH USS is the same as an EREG to which an EPDCCH candidate of an EPDCCH CSS corresponds. That is, the first to fourth embodiments of the invention may be applied to the case where an EREG to which an EPDCCH candidate of an EPDCCH USS is the same as an EREG to which an EPDCCH candidate of an EPDCCH CSS corresponds.

The EPDCCH CSS is a set of EPDCCH candidates monitored by a plurality of mobile station apparatuses 1. The EPDCCH CSS may be defined in the EPDCCH-PRB-set 1 or the EPDCCH-PRB-set 2. The EPDCCH CSS may be defined in an EPDCCH-PRB-set which is set separately from the EPDCCH-PRB-set 1 and the EPDCCH-PRB-set 2. The base station apparatus 3 may broadcast information associated with the setting of the EPDCCH CSS.

A virtual cell identity corresponding to the EPDCCH CSS may be set separately from a virtual cell identity of the EPDCCH-PRB-set 1 and a virtual cell identity of the EPDCCH-PRB-set 2. In a case where a virtual cell identity corresponding to an EPDCCH CSS is not set, a pseudo random sequence for use in scrambling the EPDCCH to which an EPDCCH CSS corresponds may be generated based on a physical layer cell identity.

Even in a case where a DCI format transmitted in an EPDCCH USS includes a carrier indicator, a DCI format transmitted in an EPDCCH CSS does not include a carrier indicator. The DCI format transmitted in the EPDCCH CSS corresponds to a serving cell in which the DCI format was transmitted.

Therefore, a set of information fields defined in a DCI format 1A of an EPDCCH CSS may be different from a set of information fields defined in a DCI format 1A of an EPDCCH USS. There is a possibility that the number of bits of a DCI format including no carrier indicator is the same as the number of bits of a DCI format including a carrier indicator. Furthermore, there is a possibility that the number of bits of a DCI format 1A including no carrier indicator and corresponding to a primary cell is the same as the number of bits of a DCI format 1A including a carrier indicator and corresponding to a secondary cell.

In a case where the mobile station apparatus 1 detects a DCI format in an EPDCCH CSS, the mobile station apparatus 1 may determine a PUCCH resource based on a parameter $N^{(e1)}_{PUCCH,1}$ for the EPDCCH CSS, or in a case where an EPDCCH CSS is defined in the EPDCCH-PRB-set 1 and a DCI format is detected in an EPDCCH CSS, the mobile station apparatus 1 may determine a PUCCH resource based on a parameter $N^{(e1)}_{PUCCH,1}$ for the EPDCCH-PRB-set 1.

For example, in a case where an EREG/resource element to which an EPDCCH candidate of an EPDCCH CSS is the same as an EREG/resource element to which an EPDCCH candidate of an EPDCCH USS, and furthermore, the mobile station apparatus 1 is set so as to monitor a DCI format with the same number of bits in both the EPDCCH candidate of the EPDCCH CSS and the EPDCCH candidate of the EPDCCH USS, and furthermore, in a set of information fields included in the DCI format corresponding to the EPDCCH CSS, a value of a virtual cell identity for the EPDCCH USS is the same as a value of a virtual cell identity/physical layer cell identity for the EPDCCH CSS, then the mobile station apparatus 1 may regard the DCI format as being transmitted only on the EPDCCH allocated in the EPDCCH CSS.

Thus the mobile station apparatus 1 can determine whether the detected DCI format corresponds to the EPDCCH CSS or the EPDCCH USS, and the mobile station apparatus 1 can efficiently transmit, using a PUCCH, a HARQ-ACK in response to a transport block transmitted on a PDSCH.

Next, an apparatus configuration according to the present embodiment is described below.

Figure 16:
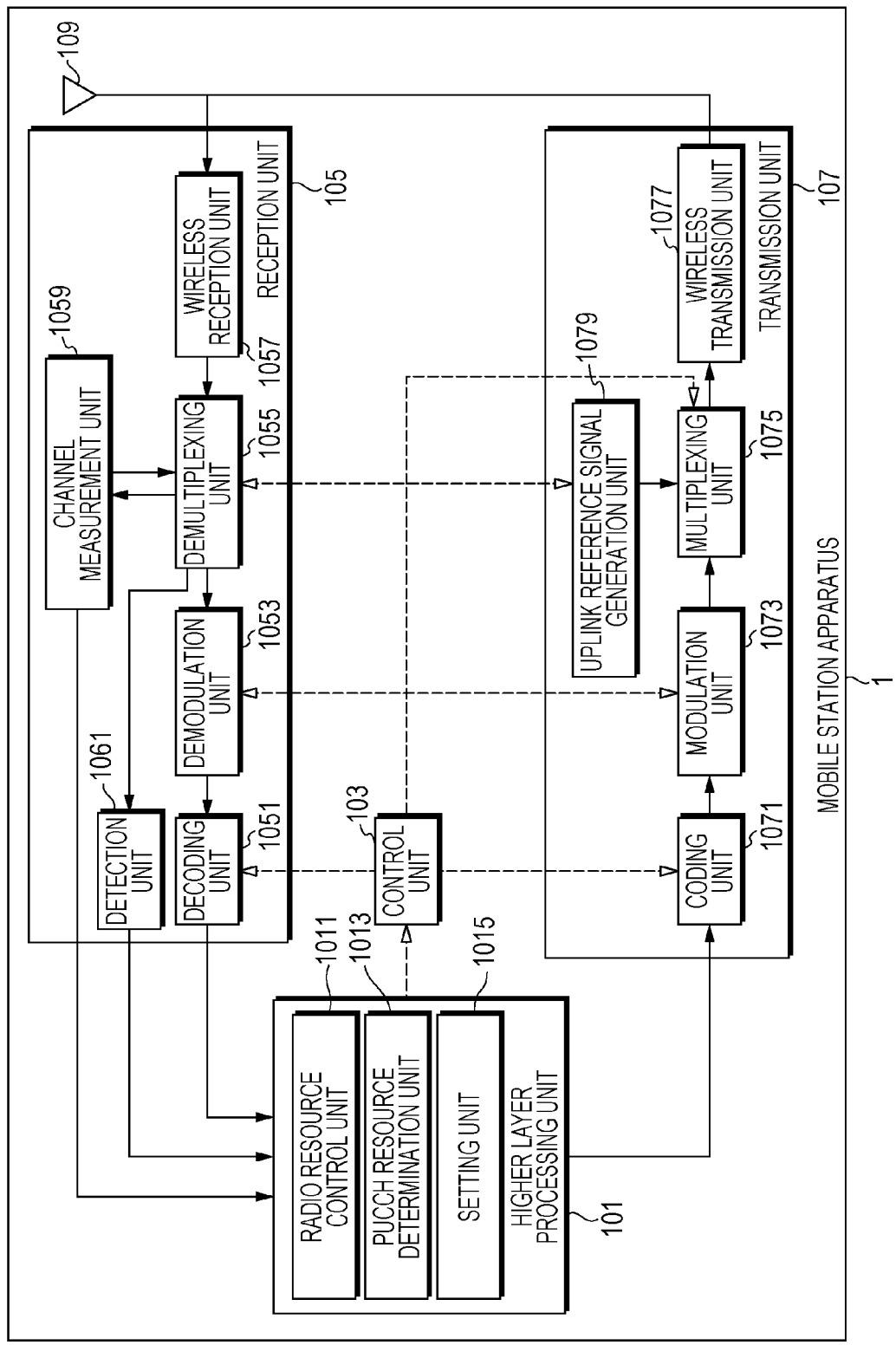
FIG. 16 is a simplified block diagram illustrating a configuration of a mobile station apparatus 1 according to the present embodiment.

FIG. 16 is a simplified block diagram illustrating a configuration of the mobile station apparatus 1 according to the present embodiment. As illustrated in the figure, the mobile station apparatus 1 includes a higher layer processing unit 101, a control unit 103, a reception unit 105, a transmission unit 107, and a transmission/reception antenna 109. The higher layer processing unit 101 includes a radio resource control unit 1011, a PUCCH resource determination unit 1013, and a setting unit 1015. The reception unit 105 includes a decoding unit 1051, a demodulation unit 1053, a demultiplexing unit 1055, a wireless reception unit 1057, a channel measurement unit 1059, and a detection unit 1061. The transmission unit 107 includes a coding unit 1071, a modulation unit 1073, a multiplexing unit 1075, a wireless transmission unit 1077, and an uplink reference signal generation unit 1079.

The higher layer processing unit 101 transmits uplink data (transport block) generated by an operation performed by a user or the like to the transmission unit 107. The higher layer processing unit 101 performs processing associated with a MAC (Medium Access Control) layer, a PDCP (Packet Data Convergence Protocol) layer, a RLC (Radio Link Control) layer, and a RRC (Radio Resource Control) layer. Furthermore, the radio resource control unit 1011 generates information allocated in each uplink channel and outputs the information to the transmission unit 107.

The PUCCH resource determination unit 1015 provided in the higher layer processing unit 101 determines a PUCCH resource used to transmit uplink control information.

The setting unit 1015 provided in the higher layer processing unit 101 manages various kinds of setting information of the apparatus. For example, the setting unit 1015 performs various kinds of settings according to signaling received from the base station apparatus 3.

Based on the control information from the higher layer processing unit 101, the control unit 103 generates control signals for controlling the reception unit 105 and the transmission unit 107. The control unit 103 outputs the generated control signal to the reception unit 105 and the transmission unit 107 to control the reception unit 105 and the transmission unit 107.

According to the control signal input from the control unit 103, the reception unit 105 performs demultiplexing, demodulation, and decoding on the reception signal received from the base station apparatus 3 via the transmission/reception antenna 109 and outputs the decoded information to the higher layer processing unit 101.

The wireless reception unit 1057 converts (down-converts) the downlink signal received via the transmission/reception antenna 109 to an intermediate frequency, removes unnecessary frequency components, controls a gain level so as to maintain a proper signal level, performs an orthogonal demodulation based on an in-phase component and a quadrature component of the received signal, and converts a quadrature-demodulated analog signal to a digital signal. The wireless reception unit 1057 removes a part corresponding to a guard interval (GI) from the converted digital signal and performs a fast Fourier transform (FFT) on the resultant signal obtained after removing the guard interval thereby extracting a signal in the frequency domain.

The demultiplexing unit 1055 demultiplexes the extracted signal into a PHICH, a PDCCH, an EPDCCH, a PDSCH, and a downlink reference signal. The demultiplexing unit 1055 performs compensation on transmission channels of the PHICH, the PDCCH, the EPDCCH, and the PDSCH based on estimated values of the transmission channels input from the channel measurement unit 1059. The demultiplexing unit 1055 outputs the demultiplexed downlink reference signal to the channel measurement unit 1059.

The demodulation unit 1053 multiplies the PHICH by a corresponding code and combines, performs BPSK (Binary Phase Shift Keying) demodulation on the combined signal, and outputs the result to the decoding unit 1051. The decoding unit 1051 decodes PHICH addressed to the present apparatus and outputs the decoded HARQ indicator to the higher layer processing unit 101.

The demodulation unit 1053 performs, on the PDSCH, demodulation corresponding to the modulation method notified via the downlink grant, such as QPSK (Quadrature Phase Shift Keying), 16QAM (Quadrature Amplitude Modulation), 64QAM or the like, and outputs the result to the decoding unit 1051. The decoding unit 1051 performs decoding based on information on a coding ratio notified via downlink control information, and outputs the decoded downlink data (transport block) to the higher layer processing unit 101.

The channel measurement unit 1059 measures a downlink path loss or the channel state from the downlink reference signal input from the demultiplexing unit 1055, and outputs the measured path loss or the channel state to the higher layer processing unit 101. The channel measurement unit 1059 also calculates an estimated value of downlink transmission channel from the downlink reference signal and outputs the result to the demultiplexing unit 1055.

The detection unit 1061 detects downlink control information on the PDCCH and/or the EPDCCH and outputs the detected downlink control information to the higher layer processing unit 101. The detection unit 1061 performs QPSK demodulation and decoding on the PDCCH and/or the EPDCCH. The detection unit 1061 tries to perform blind decoding on the PDCCH and/or the EPDCCH. If the blind decoding is successful, the detection unit 1061 transmits downlink control information to the higher layer processing unit 101.

The transmission unit 107 generates an uplink reference signal according to a control signal input from the control unit 103, encodes and modulates uplink data (transport block) input from the higher layer processing unit 101, multiplexes the PUSCH, the PUSCH, and the generated uplink reference signal, and transmits the result to the base station apparatus 3 via the transmission/reception antenna 109.

The coding unit 1071 performs coding such as convolutional coding, block coding, or the like on the uplink control information input from the higher layer processing unit 101. The coding unit 1071 also performs turbo coding based on information used in scheduling of PUSCH.

The modulation unit 1073 modulates the encoded bit input from the coding unit 1071 according to a modulation method such as BPSK, QPSK, 16QAM, 64QAM or the like notified via the downlink control information or modulation method predetermined for each channel. Based on information used in scheduling of PUSCH, the modulation unit 1073 determines the number of data sequences to be space-multiplexed, maps, to a plurality of sequences, a plurality of pieces of uplink data to be transmitted on the same PUSCH by using MIMO SM (Multiple Input Multiple Output Spatial Multiplexing), and performs precoding on the resultant sequences. The modulation unit 1073 spreads the PUCCH using a cyclic shift and/or orthogonal sequence.

The uplink reference signal generation unit 1079 generates a reference signal sequence based on a physical layer cell identity (PCI) for identifying the base station apparatus 3, a virtual cell identity, or the like.

The multiplexing unit 1075 rearranges the PUSCH modulation symbols into a parallel form according to a control signal input from the control unit 103, and then performs a discrete Fourier transform (DFT) on them. Furthermore, the multiplexing unit 1075 multiplexes signals of PUCCH and PUSCH and the generated uplink reference signal individually for each transmitting antenna port. That is, the multiplexing unit 1075 maps the signals of PUCCH and PUSCH and the generated uplink reference signal to resource elements individually for each transmitting antenna port.

The wireless transmission unit 1077 performs an inverse fast Fourier transform (IFFT) on the multiplexed signal thereby performing SC-FDMA modulation, adds a guard interval to the SC-FDMA modulated SC-FDMA symbols, generates a baseband digital signal, converts the baseband digital signal to an analog signal, generates an in-phase component and a quadrature component of the intermediate frequency from the analog signal, removes frequency components unnecessary to the intermediate frequency band, up-converts the intermediate frequency signal to a high frequency signal, removes unnecessary frequency components, performs power amplification, and outputs the result to the transmission/reception antenna 109 thereby transmitting it.

Figure 17:
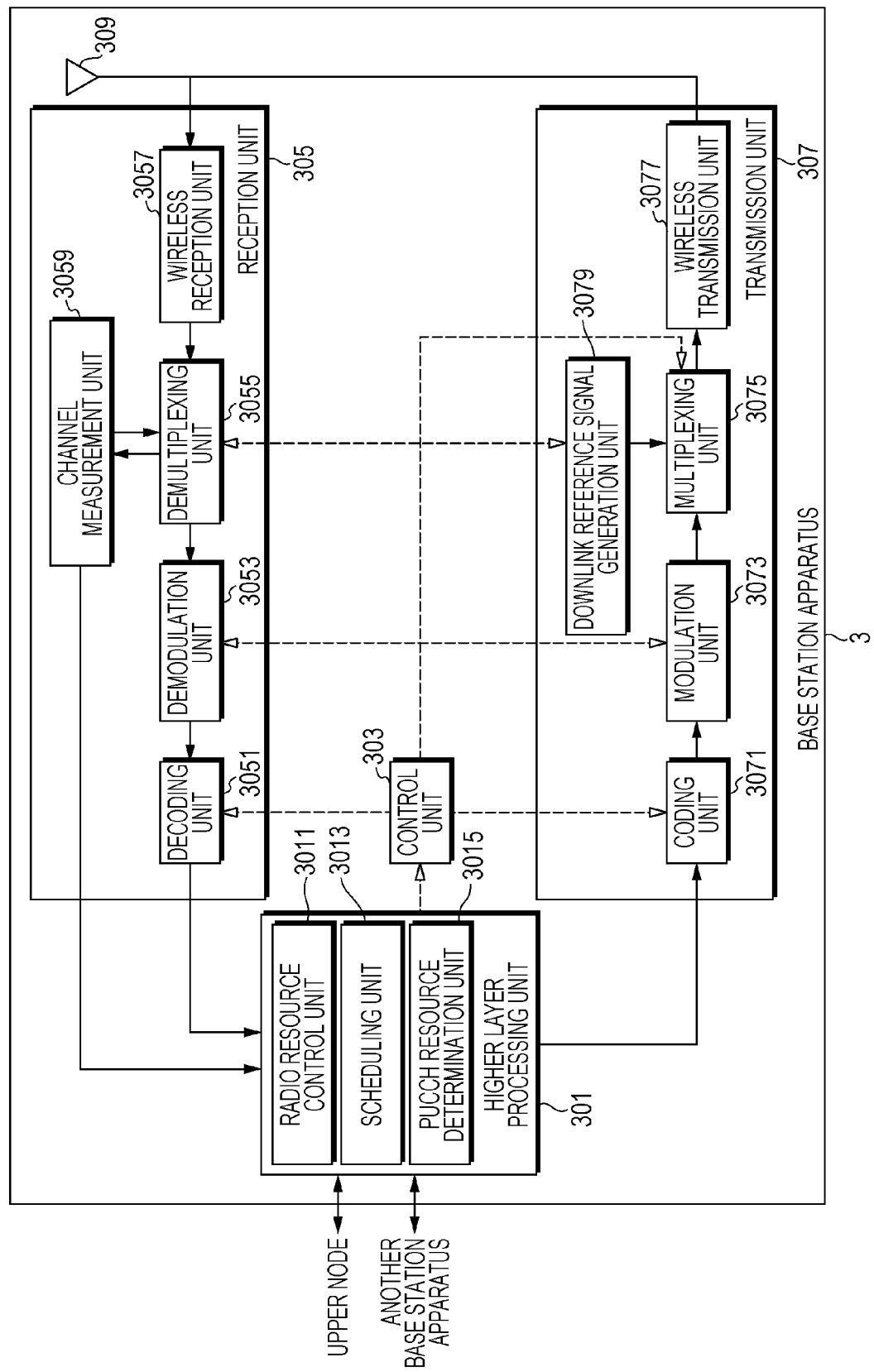
FIG. 17 is a simplified block diagram illustrating a configuration of a base station apparatus 3 according to the present embodiment.

FIG. 17 is a simplified block diagram illustrating a configuration of a base station apparatus 3 according to the present embodiment. As illustrated in the figure, the base station apparatus 3 includes a higher layer processing unit 301, a control unit 303, a reception unit 305, a transmission unit 307, and a transmission/reception antenna 309. The higher layer processing unit 301 includes a radio resource control unit 3011, a scheduling unit 3013, and a PUCCH resource determination unit 3015. The reception unit 305 includes a decoding unit 3051, a demodulation unit 3053, a demultiplexing unit 3055, a wireless reception unit 3057, and a channel measurement unit 3059. The transmission unit 307 includes a coding unit 3071, a modulation unit 3073, a multiplexing unit 3075, a wireless transmission unit 3077, and a downlink reference signal generation unit 3079.

The higher layer processing unit 301 performs processing associated with a MAC (Medium Access Control) layer, a Packet Data Convergence Protocol (PDCP) layer, a Radio Link Control (RLC) layer, and a Radio Resource Control (RRC) layer. The higher layer processing unit 301 also generates control information to control the reception unit 305 and the transmission unit 307, and outputs it to the control unit 303.

The radio resource control unit 3011 provided in the higher layer processing unit 301 generates downlink data (transport blocks), system information blocks, a RRC signal, MAC CE (Control Element), and the like, to be mapped to the downlink PDSCH, or acquires them from an upper node, and outputs them to the transmission unit 307. The radio resource control unit 3011 manages various kinds of setting information associated with each mobile station apparatus 1.

The scheduling unit 3013 provided in the higher layer processing unit 301 determines a frequency to be assigned to physical channels (PDSCH and PDSCH), a coding ratio of sub-frames and physical channels (PDSCH and PDSCH), and a modulation method and transmission power, and the like, based on an estimated value of a transmission channel, channel quality, or the like input from the channel measurement unit 3059. Based on a result of the scheduling, the scheduling unit 3013 generates control information to control the reception unit 305 and the transmission unit 307, and outputs the generated control information to the control unit 303. Furthermore, the scheduling unit 3013 outputs the result of the scheduling associated with the physical channels (PDSCH and PUSCH) to the control information generation unit 3015.

The PUCCH resource determination unit 3015 provided in the higher layer processing unit 301 determines a PUCCH resource used in receiving the uplink control information.

Based on the control information from the higher layer processing unit 301, the control unit 303 generates a control signal to control the reception unit 305 and the transmission unit 307. The control unit 303 outputs the generated control signal to the reception unit 305 and the transmission unit 307 to control the reception unit 305 and the transmission unit 307.

The reception unit 305 performs, according to the control signal input from the control unit 303, demultiplexing, demodulation, and decoding on the reception signal received from the mobile station apparatus 1 via the transmission/reception antenna 309 and outputs the decoded information to the higher layer processing unit 301. The wireless reception unit 3057 converts (down-converts) the uplink signal received via the transmission/reception antenna 309 to an intermediate frequency, removes unnecessary frequency components, controls a gain level so as to maintain a proper signal level, performs orthogonal demodulation based on an in-phase component and a quadrature component of the received signal, and converts the quadrature-demodulated analog signal to a digital signal.

The wireless reception unit 3057 removes a part corresponding to a guard interval (GI) from the converted digital signal. The wireless reception unit 3057 performs a fast Fourier transform (FFT) on the signal obtained after removing the guard interval thereby extracting a signal in the frequency domain and outputs the result to the demultiplexing unit 3055.

The demultiplexing unit 3055 demultiplexes the signal input from the wireless reception unit 3057 into signals such as a PUCCH, a PUSCH, an uplink reference signal or the like. Note that the demultiplexing is performed based on radio resource allocation information determined in advance by the radio resource control unit 3011 of the base station apparatus 3 and included in the uplink grant notified to each mobile station apparatus 1. Furthermore, the demultiplexing unit 3055 performs compensation on transmission channels of PUCCH and PUSCH based on estimated values of the transmission channels input from the channel measurement unit 3059. The demultiplexing unit 3055 outputs the demultiplexed uplink reference signal to the channel measurement unit 3059.

The demodulation unit 3053 performs an inverse discrete Fourier transform (IDFT) on the PUSCH thereby acquiring modulation symbols. Based on information notified in advance via an uplink grant to each mobile station apparatus 1 as to the number of sequences to be space multiplexed and information indicating precoding to be performed on the sequences, the demodulation unit 3053 demultiplexes modulation symbols of a plurality of pieces of uplink data transmitted on the same PUSCH by using MIMO SM.

The decoding unit 3051 decodes encoded bits of the demodulated PUCCH and PUSCH according to a predetermined coding method with a coding ratio that is predetermined or notified in advance via an uplink grant to the mobile station apparatus 1 from the present apparatus, and the decoding unit 3051 outputs the decoded uplink data and the uplink control information to the higher layer processing unit 101. In a case where the PUSCH is retransmitted, the decoding unit 3051 performs the decoding using encoded bits input from the higher layer processing unit 301 and stored in a HARQ buffer and the demodulated encoded bits. The channel measurement unit 309 measures an estimated value of a transmission channel, channel quality, or the like from the uplink reference signal input from the demultiplexing unit 3055 and outputs them to the demultiplexing unit 3055 and the higher layer processing unit 301.

According to the control signal input from the control unit 303, the transmission unit 307 generates a downlink reference signal, performs coding and modulation on a HARQ indicator input from the higher layer processing unit 301, the downlink control information, and the downlink data, multiplexes the PHICH, the PDCCH, the EPDCCH, the PDSCH, and downlink reference signal, and transmits a signal to the mobile station apparatus 1 via the transmission/reception antenna 309.

The coding unit 3071 performs coding on the HARQ indicator input from the higher layer processing unit 301, the downlink control information, and the downlink data by using a coding method determined in advance or determined by the radio resource control unit 3011 such as block coding, convolutional coding, turbo coding, or the like. The modulation unit 3073 performs modulation on the encoded bits input from the coding unit 3071 by using a modulation method determined in advance or determined by the radio resource control unit 3011 such as BPSK, QPSK, 16QAM, 64QAM or the like.

The downlink reference signal generation unit 3079 generates, as a downlink reference signal, a sequence known by the mobile station apparatus 1 according to a predetermined rule based on a physical cell identifier (PCI) or the like for identifying the base station apparatus 3. The multiplexing unit 3075 multiplexes the modulated modulation symbols of the respective channels and the generated downlink reference signals. That is, the multiplexing unit 3075 maps the modulated modulation symbols of the respective channels and the generated downlink reference signal to resource elements.

The wireless transmission unit 3077 performs an Inverse Fast Fourier Transform (IFFT) on the demultiplexed modulation symbols and the like thereby performing OFDM modulation, adds a guard interval to the OFDM-modulated OFDM symbols, generates a baseband digital signal, converts the baseband digital signal to an analog signal, generates an in-phase component and a quadrature component of the intermediate frequency from the analog signal, removes frequency components unnecessary to the intermediate frequency band, up-converts the intermediate frequency signal to a high frequency signal, removes unnecessary frequency components, performs power amplification, and outputs the result to the transmission/reception antenna 309 thereby transmitting it.

A detailed description is given below as to operations of the reception unit 105, the detection unit 1061, the PUCCH resource determination unit 1013, the setting unit 1015, the transmission unit 107, and the uplink reference signal generation unit 1079, which are provided in the mobile station apparatus 1 according to the first embodiment.

The setting unit 1015 sets a value of a virtual cell identity for the PUCCH, a first value, a second value, and a third value based on signaling received from a base station apparatus. The detection unit 1061 detects downlink control information used in scheduling of PDSCH on PDCCH or EPDCCH. The reception unit 105 receives transport blocks on the PDSCH.

In a case where the detection unit 1061 detects the downlink control information on the PDCCH, the PUCCH resource determination unit 1013 selects either the first value or the second value depending on whether the value of the virtual cell identity for the PUCCH has been set by the setting unit 1015, and the PUCCH resource determination unit 1013 determines the PUCCH resource at least based on the selected value.

In a case where the detection unit 1061 detects the downlink control information on the EPDCCH, the PUCCH resource determination unit 1013 selects either the first value or the second value depending on whether the value of the virtual cell identity for the PUCCH has been set by the setting unit 1015, and the PUCCH resource determination unit 1013 determines the PUCCH resource at least based on the selected value and the third value. The transmission unit 107 transmits a HARQ-ACK to the transport blocks by using the PUCCH resource.

In a case where the value of the virtual cell identity for PUCCH has been received, the uplink reference signal generation unit 1079 generates a DMRS (reference signal) to be time multiplexed with the PUCCH based on the value of the virtual cell identity for the PUCCH. On the other hand, in a case where the value of the virtual cell identity for PUCCH has not been received, the uplink reference signal generation unit 1079 generates the DMRS (the reference signal) based on a physical layer cell identity. The transmission unit 107 transmits the reference signal.

A program executed on the base station apparatus 3 and the mobile station apparatus 1 according to the present invention may be a program (a program that causes a computer to function) that controls a CPU (Central Processing Unit) so as to realize a function of the embodiments according to the invention. Information treated with by these apparatuses is temporarily stored in a RAM (Random Access Memory) in processing, and thereafter, is stored in various kinds of ROMs such as a Flash ROM (Read Only Memory) or a HDD (Hard Disk Drive). As required, the CPU reads out the information and changes and rewrites it.

A part of the mobile station apparatus 1 and/or the base station apparatus 3 according to the embodiment may be realized by a computer. In this case, a program for realizing the control function may be stored in a computer-readable storage medium, the program stored in this storage medium may be read by a computer system and executed thereby realizing the part of the mobile station apparatus 1 and/or the base station apparatus 3.

Note that herein the "computer system" refers to a computer system disposed in the mobile station apparatus 1 or the base station apparatus 3, and the computer system includes an OS and hardware such as a peripheral device. Furthermore, the "computer-readable storage medium" refers to a portable medium such as a flexible disk, a magneto-optical disk, a ROM, a CD-ROM, or the like or a storage apparatus such as a hard disk or the like disposed in the computer system.

The "computer-readable storage medium" may include a type that dynamically stores a program for a short time as in a case where a program is transmitted via a network such as the Internet or a communication line such as a telephone line. In this case, the "computer-readable storage medium" may be a type that holds the program for a certain period, such as a volatile memory or the like disposed in the inside of a computer system functioning as a server or a client. The program may be a program for realizing a part of the functions described above. The program may be a program that realizes the functions in combination with a program already existing in the computer system.

Furthermore, the base station apparatus 3 according to the embodiment described above may be realized in the form of an aggregate (apparatus group) of a plurality of apparatuses. Each of the apparatuses in the apparatus group may have functions of the base station apparatus 3 or part or all of each functional block according to the embodiment. It is sufficient for the apparatus group to have one set of functions or functional blocks of the base station apparatus 3. The mobile station apparatus 1 according to the embodiment described above is capable of communicate with a base station apparatus provided in the form of the aggregate.

Furthermore, part or all of the mobile station apparatus 1 and the base station apparatus 3 according to the embodiment described above may be realized as a typical integrated circuit LSI or a chip set. The functional blocks of the mobile station apparatus 1 and the functional blocks of the base station apparatus 3 may be individually realized in the form chips or part or all thereof may be integrated into a chip. The specific form of the integrated circuit is not limited to the LSI, but the integrated circuit may be realized in other forms such as a dedicated circuit or a general-purpose processor. If the progress of the semiconductor technology provides a technology for implementing an integrated circuit which replaces the LSI, the integrated circuit based on this technology may also be used.

In the embodiments described above, the mobile station apparatus has been described as an example of a terminal apparatus or a communication apparatus. However, the present invention is not limited to that, but the invention may also be applied to an electronic device firmly installed inside or outside a house or a non-portable electronic device such as a AV device, a kitchen device, a cleaning/washing apparatus, an air-conditioning apparatus, an office apparatus, a vending machine, other household apparatuses, a terminal apparatus, and a communication apparatus.

While the embodiments of the present invention have been described in detail with reference to the drawings, the invention is not limited to the details of the embodiments, but changes in design or the like are possible without departing the scope of the invention. Furthermore, various modifications are possible within the scope described in claims. Technical means disclosed in the different embodiments may be combined properly. In this case, a resultant combined embodiment falls within the technical scope of the present invention. Furthermore, elements similar in function described in the embodiments may be replaced with each other.

REFERENCE SIGNS LIST 1 (1A, 1B, 1C) mobile station apparatus
3 base station apparatus
101 higher layer processing unit
103 control unit
105 reception unit
107 transmission unit
109 transmission/reception antenna
1011 radio resource control unit
1013 PUCCH resource determination unit
1015 setting unit
1051 decoding unit
1053 demodulation unit
1055 demultiplexing unit
1057 wireless reception unit
1059 channel measurement unit
1061 detection unit
1071 coding unit
1073 modulation unit
1075 multiplexing unit
1077 wireless transmission unit
1079 uplink reference signal generation unit
301 higher layer processing unit
303 control unit
305 reception unit
307 transmission unit
309 transmission/reception antenna
3011 radio resource control unit
3013 scheduling unit
3015 PUCCH resource determination unit
3051 decoding unit
3053 demodulation unit
3055 demultiplexing unit
3057 wireless reception unit
3059 channel measurement unit
3071 coding unit
3073 modulation unit
3075 multiplexing unit
3077 wireless transmission unit
3079 downlink reference signal generation unit

The invention claimed is:

1. A terminal device comprising:
a transmission processor configured and/or programmed to perform a transmission of HARQ-ACK (Hybrid Automatic Repeat reQuest-ACKnowledgement) by using a physical uplink control channel resource for the transmission; and
a determination processor configured and/or programmed to determine the physical uplink control channel resource, wherein
in a case that the terminal device is configured with a first EPDCCH (Enhanced Physical Downlink Control CHannel)-PRB (Physical Resource Block)-set with a value, and being configured with a second EPDCCH-PRB set with the value, the value is used to generate a first demodulation reference signal associated with a first EPDCCH belonging to the first EPDCCH-PRB-set, and the value being used to generate a second demodulation reference signal associated with a second EPDCCH belonging to the second EPDCCH-PRB-set,
in a case that the terminal device receives a first EPDCCH candidate with first downlink control information with a payload size, the first EPDCCH candidate corresponding to one of the first EPDCCH-PRB-set and the second EPDCCH-PRB-set and is mapped to a set of resource elements,
in a case that the terminal device is configured to monitor a second EPDCCH candidate with second downlink control information with the payload size, the second EPDCCH candidate corresponding to other of the first EPDCCH-PRB-set and the second EPDCCH-PRB-set and is mapped to the set of resource elements, and
in a case that an index of a first ECCE (Enhanced Control Channel Element) of the first EPDCCH candidate is used for determining the physical uplink control channel resource,
the determination processor is configured and/or programmed to determine the index based on the first EPDCCH-PRB-set.

2. The terminal device according to claim 1, wherein
the mapping to the set of resource elements is made based on at least one of:
first positions of CRSs (Cell-specific Reference Signals);
at least second positions of first CSI-RSs (Channel State Information-Reference Signals); and
at least one starting OFDM symbol.

3. The terminal device according to claim 2, wherein
the determination processor is configured and/or programmed to use first information related to the one of the first EPDCCH-PRB-set and the second EPDCCH-PRB-set, the first information being for determining the mapping of the first EPDCCH candidate, and
use second information related to the other of the first EPDCCH-PRB-set and the second EPDCCH-PRB-set, the second information being for determining the mapping of the second EPDCCH candidate.

4. The terminal device according to claim 2, wherein
the at least second positions of the first CSI-RSs includes third positions of second CSI-RSs and fourth positions of third CSI-RSs,
the third positions of the second CSI-RSs and the fourth positions of the third CSI-RSs are configured independently,
the third positions are used for mapping of the first EPDCCH candidate, and
the fourth positions are used for mapping of the second EPDCCH candidate.

5. The terminal device according to claim 2, wherein
the at least one starting OFDM includes first and second starting OFDM symbols,
the first and second starting OFDM symbols are configured independently,
the first starting OFDM symbol is used for mapping of the first EPDCCH candidate, and
the second starting OFDM symbol is used for mapping of the second EPDCCH candidate.

6. A base station device comprising:
a reception processor configured and/or programmed to receive, from a terminal device, a transmission of HARQ-ACK (Hybrid Automatic Repeat reQuest-ACKnowledgement) by using a physical uplink control channel resource for the transmission; and a determination processor configured and/or programmed to determine the physical uplink control channel resource, wherein in a case that the terminal device is configured with a first EPDCCH (Enhanced Physical Downlink Control CHannel)-PRB (Physical Resource Block)-set with a value, and is configured with a second EPDCCH-PRB set with the value, the value being used by the terminal device to generate a first demodulation reference signal associated with a first EPDCCH belonging to the first EPDCCH-PRB-set and a second demodulation reference signal associated with a second EPDCCH belonging to the second EPDCCH-PRB-set, in a case that the base station device transmits a first EPDCCH candidate with first downlink control information with a payload size, the first EPDCCH candidate corresponding to one of the first EPDCCH-PRB-set and the second EPDCCH-PRB-set and is mapped to a set of resource elements, in a case that the terminal device is configured to monitor a second EPDCCH candidate with second downlink control information with the payload size, the second EPDCCH candidate corresponding to other of the first EPDCCH-PRB-set and the second EPDCCH-PRB-set and is mapped to the set of resource elements, and in a case that an index of a first ECCE (Enhanced Control Channel Element) of the first EPDCCH candidate is used for determining the physical uplink control channel resource, the determination processor is configured and/or programmed to determine the index based on the first EPDCCH-PRB-set.

7. The base station device according to claim 6, wherein the mapping to the set of resource elements is made based on at least one of:
   first positions of CRSs (Cell-specific Reference Signals);
   at least second positions of first CSI-RSs (Channel State Information-Reference Signals); and
   at least one starting OFDM symbol.

8. The base station device according to claim 7, wherein the determination processor is configured and/or programmed to
use first information related to the one of the first EPDCCH-PRB-set and the second EPDCCH-PRB-set, the first information being for determining the mapping of the first EPDCCH candidate, and
use second information related to the other of the first EPDCCH-PRB-set and the second EPDCCH-PRB-set, the second information being for determining the mapping of the second EPDCCH candidate.

9. The base station device according to claim 7, wherein the at least second positions of the first CSI-RSs includes third positions of second CSI-RSs and fourth positions of third CSI-RSs,
the third positions of the second CSI-RSs and the fourth positions of the third CSI-RSs are configured independently,
the third positions are used for mapping of the first EPDCCH candidate, and
the fourth positions are used for mapping of the second EPDCCH candidate.

10. The base station device according to claim 7, wherein the at least one starting OFDM includes first and second starting OFDM symbols,
the first and second starting OFDM symbols are configured independently,
the first starting OFDM symbol is used for mapping of the first EPDCCH candidate, and
the second starting OFDM symbol is used for mapping of the second EPDCCH candidate.

11. A wireless communication method used for a terminal device, the wireless communication method comprising:
performing a transmission of HARQ-ACK (Hybrid Automatic Repeat reQuest-ACKnowledgement) by using a physical uplink control channel resource for the transmission; and
determining the physical uplink control channel resource, wherein
in a case that the terminal device is configured with a first EPDCCH (Enhanced Physical Downlink Control CHannel)-PRB (Physical Resource Block)-set with a value, and is configured with a second EPDCCH-PRB set with the value, the value being used to generate a first demodulation reference signal associated with a first EPDCCH belonging to the first EPDCCH-PRB-set, and the value being used to generate a second demodulation reference signal associated with a second EPDCCH belonging to the second EPDCCH-PRB-set,
in a case that the terminal device receives a first EPDCCH candidate with first downlink control information with a payload size, the first EPDCCH candidate corresponding to one of the first EPDCCH-PRB-set and the second EPDCCH-PRB-set and is mapped to a set of resource elements,
in a case that the terminal device is configured to monitor a second EPDCCH candidate with second downlink control information with the payload size, the second EPDCCH candidate corresponding to other of the first EPDCCH-PRB-set and the second EPDCCH-PRB-set and is mapped to the set of resource elements, and
in a case that an index of a first ECCE (Enhanced Control Channel Element) of the first EPDCCH candidate is used for determining the physical uplink control channel resource,
determining the index based on the first EPDCCH-PRB-set.

12. A wireless communication method used for a base station device, the wireless communication method comprising:
receiving, from a terminal device, a transmission of HARQ-ACK (Hybrid Automatic Repeat reQuest-ACKnowledgement) by using a physical uplink control channel resource for the transmission; and
determining the physical uplink control channel resource, wherein
in a case that the terminal device is configured with a first EPDCCH (Enhanced Physical Downlink Control CHannel)-PRB (Physical Resource Block)-set with a value, and is configured with a second EPDCCH-PRB set with the value, the value being used by the terminal device to generate a first demodulation reference signal associated with a first EPDCCH belonging to the first EPDCCH-PRB-set and a second demodulation reference signal associated with a second EPDCCH belonging to the second EPDCCH-P RB-set,
in a case that the base station device transmits a first EPDCCH candidate with first downlink control information with a payload size, the first EPDCCH candidate corresponding to one of the first EPDCCH-PRB-set and the second EPDCCH-PRB-sets and is mapped to a set of resource elements, in a case that the terminal device is configured to monitor a second EPDCCH candidate with second downlink control information with the payload size, the second EPDCCH candidate corresponding to other of the first EPDCCH-PRB-set and the second EPDCCH-PRB-set and is mapped to the set of resource elements, and in a case that an index of a first ECCE (Enhanced Control Channel Element) of the first EPDCCH candidate is used for determining the physical uplink control channel resource, determining the index based on the first EPDCCH-PRB-set.

* * * * *